US012724996B2

(12) United States Patent
Miura

(10) Patent No.: US 12,724,996 B2
(45) Date of Patent: Sep. 1, 2026

(54) PRINTING SYSTEM AND CONTROL METHOD OF PRINTING SYSTEM

(71) Applicant: SEIKO EPSON CORPORATION, Tokyo (JP)

(72) Inventor: Rina Miura, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 252 days.

(21) Appl. No.: 18/437,575

(22) Filed: Feb. 9, 2024

(65) Prior Publication Data

US 2024/0273325 A1 Aug. 15, 2024

(30) Foreign Application Priority Data

Feb. 13, 2023 (JP) ................................ 2023-019908

(51) Int. Cl.
*G06K 15/00* (2006.01)
*G06F 3/12* (2006.01)
*G06K 15/02* (2006.01)

(52) U.S. Cl.
CPC ....... *G06K 15/4065* (2013.01); *G06F 3/1207* (2013.01); *G06F 3/1254* (2013.01); *G06F 3/1257* (2013.01); *G06F 3/1288* (2013.01); *G06K 15/1823* (2013.01)

(58) Field of Classification Search
CPC ............ G06K 15/4065; G06K 15/1823; G06F 3/1207; G06F 3/1254; G06F 3/1257; G06F 3/1288
See application file for complete search history.

(56) References Cited

U.S. PATENT DOCUMENTS

2020/0366812 A1* 11/2020 Hirao .................. H04N 1/6033
2022/0038603 A1* 2/2022 Shiga ................ H04N 1/00087
2022/0360687 A1* 11/2022 Chang .................... H04N 1/605
2023/0071492 A1* 3/2023 Chang ............... G06K 15/1868

FOREIGN PATENT DOCUMENTS

JP 2005341215 A 12/2005

* cited by examiner

*Primary Examiner* — John R Wallace
(74) *Attorney, Agent, or Firm* — CHIP LAW GROUP

(57) ABSTRACT

A printer or the like transmits first printing characteristic information indicating a characteristic of a first image, and first medium information indicating a printing medium used for printing to a server apparatus, the server apparatus generates analysis information by analyzing a relationship between a plurality of pieces of first printing characteristic information and a plurality of pieces of first medium information, the printer or the like generates second printing characteristic information indicating a characteristic of a second image when the user gives an instruction to print the second image, to transmit the second printing characteristic information to the server apparatus, the server apparatus determines second medium information indicating a printing medium conforming to the second printing characteristic information based on the analysis information, to transmit the second medium information to the printer or the like, and the printer or the like displays the second medium information.

7 Claims, 11 Drawing Sheets

FIG. 7

TBL

PS MS

| PRINTING CHARACTERISTIC | CONFORMABLE PAPER |
|---|---|
| HIGH-KEY TONE | PHOTO PAPER <GLOSSY><br>PHOTO PAPER <SILK TONE> |
| LOW-KEY TONE | PHOTO PAPER CRISPIA <HIGH-GLOSSY><br>PHOTO MATTE PAPER |
| POP TONE | PHOTO MATTE PAPER<br>DRAWING MATERIAL PAPER |
| MONOCHROME SEPIA TONE | FINE ART PAPER<br>JAPANESE PAPER |
| ... | ... |

PRINTING SYSTEM AND CONTROL METHOD OF PRINTING SYSTEM

The present application is based on, and claims priority from JP Application Serial Number 2023-019908, filed Feb. 13, 2023, the disclosure of which is hereby incorporated by reference herein in its entirety.

BACKGROUND

1. Technical Field

The present disclosure relates to a printing system and a control method of a printing system.

2. Related Art

JP-A-2005-341215 discloses a printing management apparatus by which a user sets printing paper based on a correspondence paper list acquired from a printer driver and a display paper list selected and displayed in accordance with a type of a selected document.

In the system disclosed in JP-A-2005-341215, the user selects paper to be used when printing is executed. However, particularly when printing a photo image, it is preferable to select appropriate paper in accordance with a characteristic of printing data, but it may be difficult for the user to know the appropriate paper.

SUMMARY

According to an aspect of the present disclosure, a printing system is a printing system including a printing apparatus including a first display section, a terminal apparatus including a second display section, and a server apparatus communicably connected to the printing apparatus and the terminal apparatus, in which at least one of the printing apparatus and the terminal apparatus generates first printing characteristic information indicating a characteristic of a first image for which a user gives a printing instruction, to transmit the first printing characteristic information and first medium information indicating a printing medium used for printing to the server apparatus, the server apparatus stores a plurality of pieces of the first printing characteristic information and a plurality of pieces of the first medium information in association with each other, to generate analysis information by analyzing a relationship between the plurality of pieces of first printing characteristic information and the plurality of pieces of first medium information, at least one of the printing apparatus and the terminal apparatus generates second printing characteristic information indicating a characteristic of a second image different from the first image when the user gives an instruction to print the second image, to transmit the second printing characteristic information to the server apparatus, the server apparatus determines second medium information indicating a printing medium conforming to the second printing characteristic information based on the analysis information, to transmit the second medium information to at least one of the printing apparatus and the terminal apparatus, and at least one of the printing apparatus and the terminal apparatus displays the second medium information on at least one of the first display section and the second display section.

According to another aspect of the present disclosure, a control method of a printing system is a control method of a printing system including a printing apparatus including a first display section, a terminal apparatus including a second display section, and a server apparatus communicably connected to the printing apparatus and the terminal apparatus, the control method including generating, via at least one of the printing apparatus and the terminal apparatus, first printing characteristic information indicating a characteristic of a first image for which a user gives a printing instruction, to transmit the first printing characteristic information and first medium information indicating a printing medium used for printing to the server apparatus, storing, via the server apparatus, a plurality of pieces of the first printing characteristic information and a plurality of pieces of the first medium information in association with each other, to generate analysis information by analyzing a relationship between the plurality of pieces of first printing characteristic information and the plurality of pieces of first medium information, generating, via at least one of the printing apparatus and the terminal apparatus, second printing characteristic information indicating a characteristic of a second image different from the first image when the user gives an instruction to print the second image, to transmit the second printing characteristic information to the server apparatus, determining, via the server apparatus, second medium information indicating a printing medium conforming to the second printing characteristic information based on the analysis information, to transmit the second medium information to at least one of the printing apparatus and the terminal apparatus, and displaying, via at least one of the printing apparatus and the terminal apparatus, the second medium information on at least one of the first display section and the second display section.

BRIEF DESCRIPTION OF THE DRAWINGS

FIG. 7 is a diagram illustrating an example of an analysis result table generated by the server apparatus.

DESCRIPTION OF EMBODIMENTS

Hereinafter, the present embodiment will be described with reference to the accompanying drawings.

Figure 1:
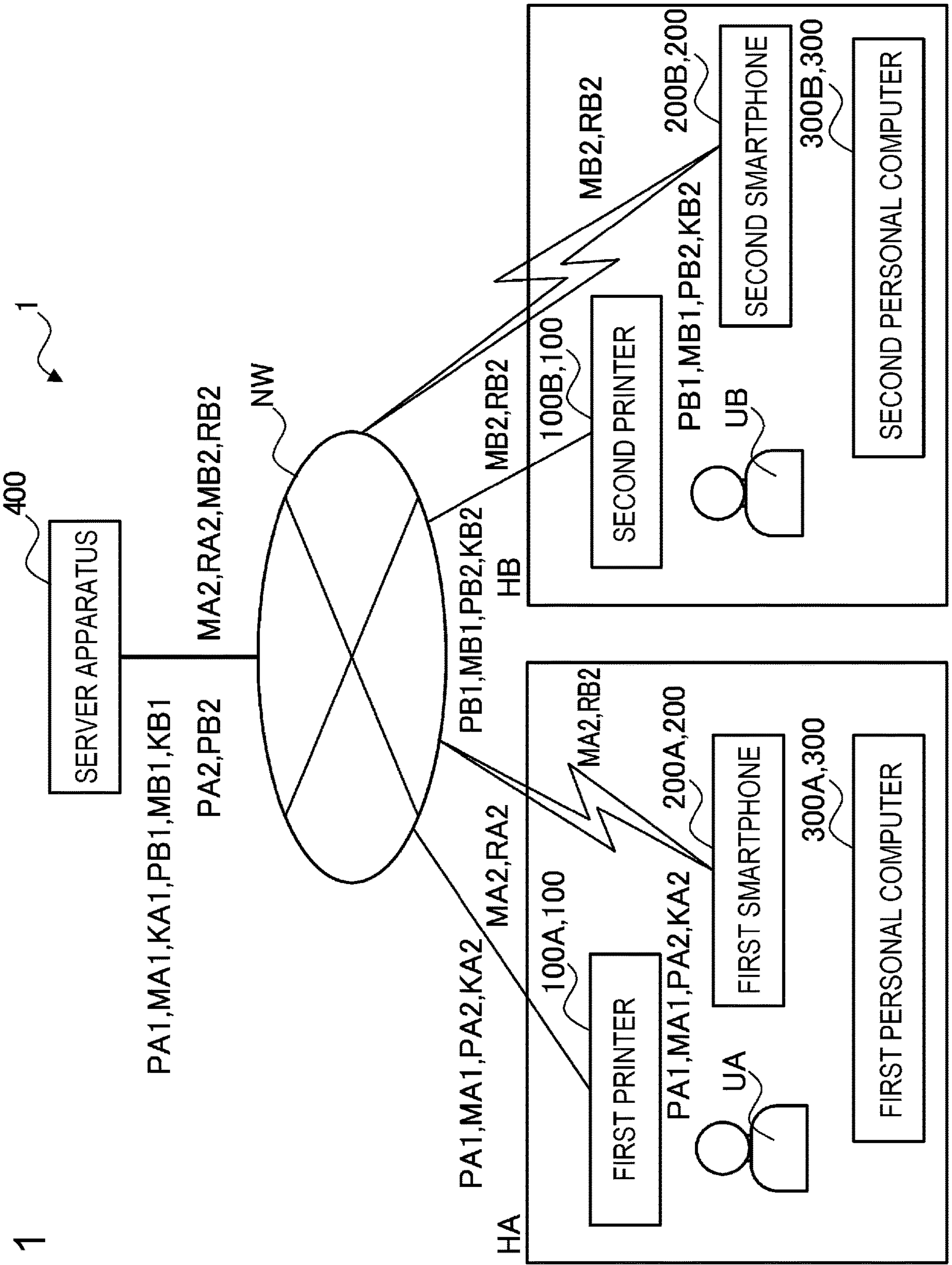
FIG. 1 is a diagram illustrating an example of a configuration of a printing system according to the present embodiment.

First, a configuration of a printing system 1 according to the present embodiment will be described with reference to FIG. 1. FIG. 1 is a diagram illustrating an example of the configuration of the printing system 1 according to the present embodiment. As illustrated in FIG. 1, the printing system 1 is provided with a printer 100, a smartphone 200, a personal computer 300, and a server apparatus 400.

The server apparatus 400 is communicably connected to each of the printer 100, the smartphone 200, and the personal computer 300 via a network NW. The network NW is, for example, the Internet.

In the present embodiment, a case in which the network NW is the Internet will be described, but the present disclosure is not limited to this. The network NW may be, for example, a local area network (LAN) or a wide area network (WAN).

The printer 100 includes a first printer 100A and a second printer 100B. The smartphone 200 includes a first smartphone 200A and a second smartphone 200B. The personal computer 300 includes a first personal computer 300A and a second personal computer 300B.

As illustrated in FIG. 1, the first printer 100A, the first smartphone 200A, and the first personal computer 300A are arranged in a living room HA of a first user UA. In addition, the second printer 100B, the second smartphone 200B, and the second personal computer 300B are arranged in a living room HB of a second user UB. In addition, the first printer 100A, the first smartphone 200A, and the first personal computer 300A are used by the first user UA. The second printer 100B, the second smartphone 200B, and the second personal computer 300B are used by the second user UB. Note that the first user UA may be one user or one of a plurality of users. In addition, the second user UB may be one user or one of a plurality of users.

The first smartphone 200A and the first personal computer 300A are communicably connected to the first printer 100A. The second smartphone 200B and the second personal computer 300B are communicably connected to the second printer 100B.

The printer 100 corresponds to an example of a “printing apparatus”.

In addition, each of the smartphone 200 and the personal computer 300 corresponds to an example of a “terminal apparatus”.

In the present embodiment, a case in which the “terminal apparatus” is the smartphone 200 and the personal computer 300 will be described, but the present disclosure is not limited to this. The “terminal apparatus” may be, for example, the smartphone 200 or the personal computer 300.

In the present embodiment, a case in which the “printing apparatus” is the printer 100 will be described, but the present disclosure is not limited to this. The “printing apparatus” may be, for example, a multifunction machine having a scanning function or a FAX function.

In the present embodiment, a case in which the printer 100 is configured with two printers, that is, the first printer 100A and the second printer 100B will be described, but the present disclosure is not limited to this. The printer 100 may be configured with, for example, three or more printers.

In addition, in the present embodiment, a case in which the smartphone 200 is configured with two smartphones, that is, the first smartphone 200A and the second smartphone 200B will be described, but the present disclosure is not limited to this. The smartphone 200 may be configured with, for example, three or more smartphones.

In addition, in the present embodiment, a case in which the personal computer 300 is configured with the first personal computer 300A and the second personal computer 300B will be described, but the present disclosure is not limited to this. The personal computer 300 may be configured with, for example, three or more personal computers.

Each of the first printer 100A, the first smartphone 200A, and the first personal computer 300A transmits first printing characteristic information PA1 and first medium information MA1 to the server apparatus 400. The first printing characteristic information PA1 indicates a characteristic of a first image PC11. The first image PC11 is an image for which the first user UA instructs the first printer 100A to execute printing. The first medium information MA1 indicates a printing medium M used for printing the first image PC11 in the first printer 100A.

In addition, each of the first printer 100A, the first smartphone 200A, and the first personal computer 300A transmits second printing characteristic information PA2 to the server apparatus 400. The second printing characteristic information PA2 indicates a characteristic of a second image PC21. The second image PC21 is an image different from the first image PC11, and is an image for which the first user UA instructs the first printer 100A to execute printing.

Each of the second printer 100B, the second smartphone 200B, and the second personal computer 300B transmits first printing characteristic information PB1 and first medium information MB1 to the server apparatus 400. The first printing characteristic information PB1 indicates a characteristic of a first image PC12. The first image PC12 is an image for which the second user UB instructs the second printer 100B to execute printing. The first medium information MB1 indicates the printing medium M used for printing the first image PC12 in the second printer 100B.

In addition, each of the second printer 100B, the second smartphone 200B, and the second personal computer 300B transmits second printing characteristic information PB2 to the server apparatus 400. The second printing characteristic information PB2 indicates a characteristic of a second image PC22. The second image PC22 is an image different from the first image PC12, and is an image for which the second user UB instructs the second printer 100B to execute printing.

In the following description, the first printing characteristic information PA1 and the first printing characteristic information PB1 may be referred to as first printing characteristic information P1, and the first medium information MA1 and the first medium information MB1 may be referred to as first medium information M1. In addition, the second printing characteristic information PA2 and the second printing characteristic information PB2 may be referred to as second printing characteristic information P2. In addition, the first image PC11 and the first image PC12 may be referred to as a first image PC1, and the second image PC21 and the second image PC22 may be referred to as a second image PC2.

The server apparatus 400 stores each of a plurality of pieces of first printing characteristic information PA1 and each of a plurality of pieces of first medium information MAL in association with each other, stores a plurality of pieces of first printing characteristic information PB1 and a plurality of pieces of first medium information MB1 in association with each other, and accumulates these pieces of information. In addition, the server apparatus 400 generates analysis information AS by analyzing a relationship between a plurality of pieces of first printing characteristic information P1 and a plurality of pieces of first medium information M1.

The server apparatus 400 determines second medium information M2 indicating the printing medium M conforming to the second printing characteristic information P2 based on the analysis information AS. The second medium information M2 includes second medium information MA2 and second medium information MB2. The second medium information MA2 indicates the printing medium M conforming to the second printing characteristic information PA2. The second medium information MB2 indicates the printing medium M conforming to the second printing characteristic information PB2.

The server apparatus 400 transmits the second medium information MA2 to the first printer 100A, the first smartphone 200A, and the first personal computer 300A. Each of the first printer 100A, the first smartphone 200A, and the first personal computer 300A displays the second medium information MA2.

In addition, the server apparatus 400 transmits the second medium information MB2 to the second printer 100B, the second smartphone 200B, and the second personal computer 300B. Each of the second printer 100B, the second smartphone 200B, and the second personal computer 300B displays the second medium information MB2.

Hereinafter, configurations of the printer 100, the smartphone 200, the personal computer 300, and the server apparatus 400 will be described with reference to FIGS. 2 to 6.

First, the configuration of the printer 100 will be described with reference to FIGS. 2 and 3.

Figure 2:
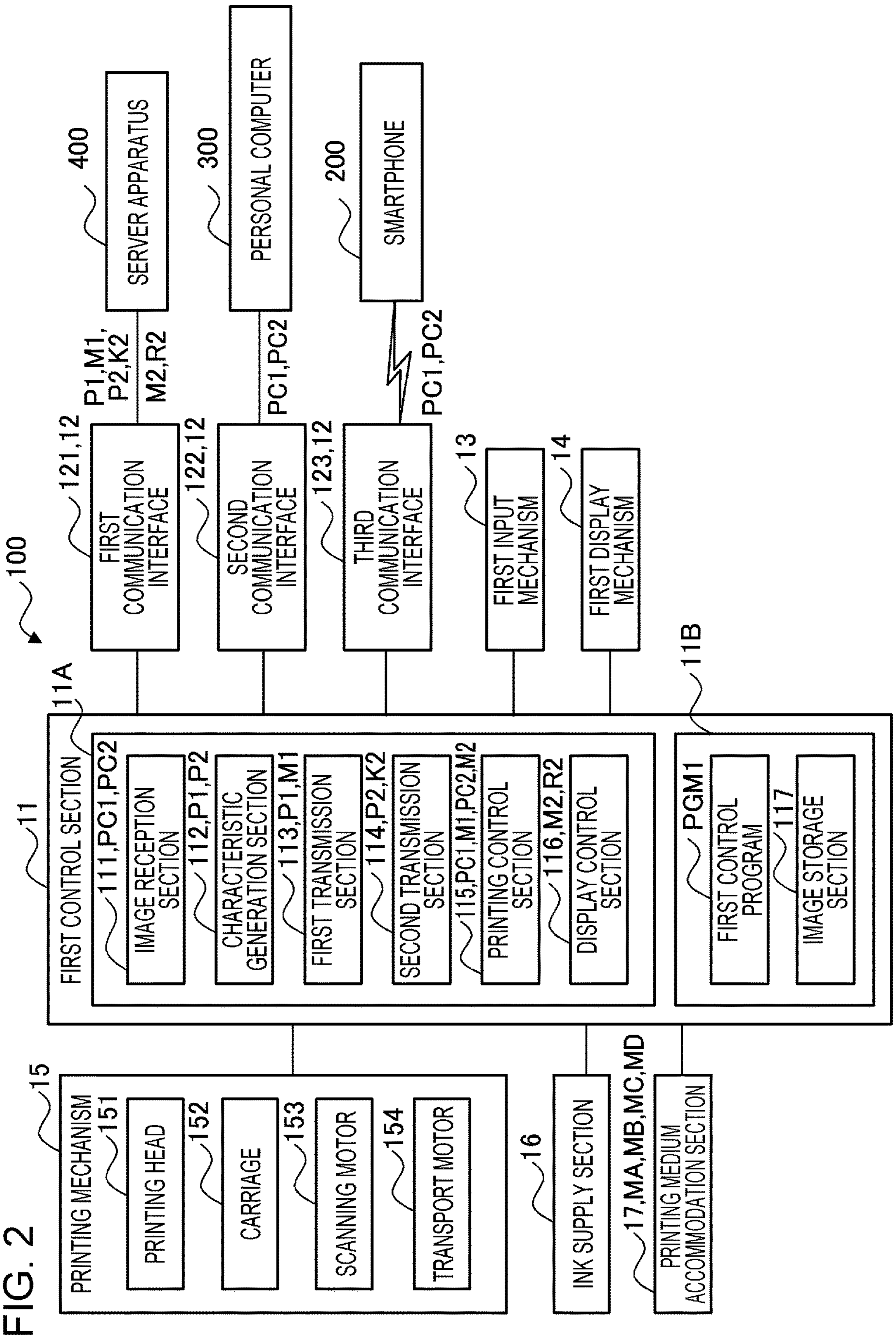
FIG. 2 is a diagram illustrating an example of a configuration of a printer according to the present embodiment.

FIG. 2 is a diagram illustrating an example of the configuration of the printer 100 according to the present embodiment.

Note that the configurations of the first printer 100A and the second printer 100B are substantially the same. Therefore, in the following description, when the first printer 100A and the second printer 100B are not distinguished from each other, each of the first printer 100A and the second printer 100B may be referred to as the printer 100.

The printer 100 prints a text, an image, or the like on the printing medium M such as printing paper.

As illustrated in FIG. 2, the printer 100 is provided with a first control section 11, a communication interface 12, a first input mechanism 13, a first display mechanism 14, a printing mechanism 15, an ink supply section 16, and a printing medium accommodation section 17.

The first control section 11 is provided with a first processor 11A such as a central processing unit (CPU), a first memory 11B such as a read only memory (ROM) or a random access memory (RAM), and controls each of the sections of the printer 100. The first memory 11B stores a first control program PGM1. In addition, the first memory 11B may be provided with a magnetic storage device such as a hard disk drive (HDD), or a semiconductor storage device such as a solid state drive (SSD).

In the first control section 11, the first processor 11A reads out the first control program PGM1 stored in the first memory 11B to execute processing. In other words, the first control section 11 executes the processing by cooperation of hardware and software.

The first processor 11A may be configured with a single processor, or may have a configuration in which a plurality of processors functions as the first processor 11A.

In the present embodiment, the first processor 11A executes the first control program PGM1 to control each of the sections of the printer 100, but the present disclosure is not limited to this. The first control section 11 may be provided with, for example, an application specific integrated circuit (ASIC), and the ASIC may execute processing by an installed function. In addition, the first control section 11 may be provided with, for example, a signal processing circuit, and the signal processing circuit may execute signal processing to execute the processing.

The communication interface 12 is provided with a connector and an interface circuit, and is coupled to the first control section 11. The communication interface 12 is an interface for executing communication with each of the smartphone 200, the personal computer 300, and the server apparatus 400. The communication interface 12 includes a first communication interface 121, a second communication interface 122, and a third communication interface 123.

The first communication interface 121 is, for example, an interface for executing communication with the server apparatus 400 in compliance with an Ethernet (registered trademark) standard.

The second communication interface 122 is, for example, an interface for executing communication with the personal computer 300 in compliance with the Ethernet (registered trademark) standard.

The third communication interface 123 is, for example, an interface for executing communication with the smartphone 200 in compliance with a Wi-Fi (registered trademark) standard.

The first input mechanism 13 is provided with an operation switch provided in the printer 100 or an input section such as a touch panel, detects a user's operation to the input section, and outputs a detection signal corresponding to the operation to the first control section 11. The first control section 11 executes the processing corresponding to the user's operation based on the input from the first input mechanism 13.

The first display mechanism 14 is provided with a plurality of light emitting diodes (LEDs), a liquid crystal display (LCD), and the like, and executes turning on, turning off, and blinking of the LEDs in a predetermined aspect, and display of information on the LCD, and the like in accordance with the control of the first control section 11.

The first display mechanism 14 corresponds to an example of a "first display section".

The printing mechanism 15 prints a text, an image, or the like on the printing medium M such as the printing paper by using the ink in accordance with an instruction of the first control section 11. The printing mechanism 15 is provided with a printing head 151, a carriage 152, a scanning motor 153, and a transport motor 154 as a configuration related to printing.

The printing head 151 is of an ink jet system, and discharges the ink supplied from the ink supply section 16 toward the printing medium M. The printing head 151 is mounted on the carriage 152, and executes scanning in a main scanning direction X. The main scanning direction X is a direction intersecting with a sub-scanning direction Y. The sub-scanning direction Y indicates a transport direction of the printing medium M. The scanning motor 153 causes the carriage 152 to execute scanning in the main scanning direction X. The transport motor 154 transports the printing medium M in the transport direction.

The printing mechanism 15 will be further described with reference to FIG. 3.

The ink supply section 16 accommodates an ink tank that stores the ink, and supplies the ink from the ink tank to the printing head 151 of the printing mechanism 15. The ink supplied by the ink supply section 16 is, for example, the ink of each color of cyan (C), magenta (M), yellow (Y), and black (K).

The printing medium accommodation section 17 is configured to accommodate the printing medium M. When the printing medium M is cut paper, the printing medium accommodation section 17 feeds out the accommodated cut paper to a transport path (not illustrated) by transport of the transport motor 154. The printing medium accommodation section 17 may have a configuration in which a printed matter, which is the printing medium M after printing, is recovered. The configuration in which the printed matter is recovered may be a configuration in which the cut paper is stacked and placed.

Hereinafter, functional blocks provided in the first control section 11 of the printer 100 will be described.

The first control section 11 is provided with, as functional blocks, an image reception section 111, a characteristic generation section 112, a first transmission section 113, a second transmission section 114, a printing control section 115, a display control section 116, and an image storage section 117.

The first processor 11A executes the first control program PGM1, so that the first processor 11A functions as the image reception section 111, the characteristic generation section 112, the first transmission section 113, the second transmission section 114, the printing control section 115, and the display control section 116. In addition, the first processor 11A executes the first control program PGM1, so that the first control section 11 causes the first memory 11B to function as the image storage section 117.

The image storage section 117 stores the first image PC1 and the second image PC2. The first image PC1 and the second image PC2 are printing target images received by the image reception section 111, and are stored in the image storage section 117 by the image reception section 111.

The image reception section 111 receives the first image PC1 and the second image PC2 from the smartphone 200 and the personal computer 300. In addition, the image reception section 111 stores the first image PC1 and the second image PC2 in the image storage section 117.

Note that the second image PC2 is an image received by the image reception section 111 after the analysis information AS is generated by the server apparatus 400.

The characteristic generation section 112 generates the first printing characteristic information P1 indicating the characteristic of the first image PC1. The first printing characteristic information P1 includes subject information indicating a feature of a subject included in the first image PC1, color tone information indicating a color tone of the first image PC1, and model information indicating a model of the printer 100.

In addition, the first printing characteristic information P1 may include information indicating whether or not the text is included in the first image PC1. In addition, the first printing characteristic information P1 may include resolution information of the first image PC1. In addition, the first printing characteristic information P1 may include information indicating a type of the ink arranged in the ink supply section 16 of the printer 100.

In addition, the characteristic generation section 112 generates the second printing characteristic information P2 indicating the characteristic of the second image PC2. The second printing characteristic information P2 includes subject information indicating a feature of a subject included in the second image PC2, color tone information indicating a color tone of the second image PC2, and model information indicating a model of the printer 100.

In addition, the second printing characteristic information P2 may include information indicating whether or not the text is included in the second image PC2. In addition, the second printing characteristic information P2 may include resolution information of the second image PC2. In addition, the second printing characteristic information P2 may include information indicating a type of the ink arranged in the ink supply section 16 of the printer 100.

Note that the subject information includes, for example, a fact that the subject is a person and a fact that the subject is a scene. When the subject is a person, the subject information includes whether or not the image is a portrait photo, whether or not the image is a snap photo, and the like. When the subject is a scene, the subject information includes a fact that the subject is a near scene, a fact that the subject is a far scene, and the like.

In addition, the color tone information includes a color, a contrast, and a tone of the entire image.

When an instruction to print the first image PC1 is received from the first input mechanism 13, the first transmission section 113 transmits the first printing characteristic information P1 and the first medium information M1 to the server apparatus 400 in association with each other. The first medium information M1 indicates the printing medium M used for printing the first image PC1.

For example, when an instruction to print the first image PC1 is received from the first input mechanism 13, the first transmission section 113 transmits the first printing characteristic information P1 and the first medium information M1 to the server apparatus 400 in association with each other.

In addition, for example, the first transmission section 113 may transmit the first printing characteristic information P1 and the first medium information M1 to the server apparatus 400 in association with each other each time a preset period elapses. The preset period may be, for example, one day or 10 days. In this case, when the instruction to print the first image PC1 is received from the first input mechanism 13, the first printing characteristic information P1 and the first medium information M1 are stored in the image storage section 117 in association with each other.

The second transmission section 114 transmits holding medium information K2 indicating a type of the printing medium M held by the user to the server apparatus 400.

The type of the printing medium M includes a size of the printing medium M and a type of paper. The size of the printing medium M includes, for example, sizes such as A4, A3, B4, and B5 defined by ISO 216. In addition, the size of the printing medium M includes, for example, sizes such as an L paper size and a 2 L paper size defined by JIS standards for photo printing. The type of paper includes glossy photo paper, high-glossy (CRISPIA) photo paper, silk tone photo paper, photo matte paper, drawing material paper, fine art paper, and Japanese paper.

In addition, when an instruction to select the second image PC2 as a printing target is received from the first input mechanism 13, the second transmission section 114 transmits the second printing characteristic information P2 to the server apparatus 400. For example, when the instruction to select the second image PC2 as the printing target is received from the first input mechanism 13, the second transmission section 114 transmits the second printing characteristic information P2 to the server apparatus 400.

When the printing instruction is received from the first input mechanism 13, the smartphone 200, and the personal computer 300, the printing control section 115 prints the first image PC1 and the second image PC2 on the designated printing medium M. For example, when the printing instruction of the first image PC1 is received from the first input mechanism 13, the printing control section 115 prints the first image PC1 on the printing medium M corresponding to the first medium information M1.

When the instruction to select the second image PC2 as the printing target is received from the first input mechanism 13, the display control section 116 receives the second medium information M2 from the server apparatus 400. The display control section 116 displays an image indicating the second medium information M2 on the LCD of the first display mechanism 14.

In addition, when the instruction to select the second image PC2 as the printing target is received from the first input mechanism 13, the display control section 116 receives conformity rank information R2 from the server apparatus 400. The conformity rank information R2 indicates a rank in which each of a plurality of print media M indicated by the holding medium information K2 conforms to the second printing characteristic information P2. The holding medium information K2 indicates the type of the printing medium M held by the user. The display control section 116 displays an image indicating the holding medium information K2 and the conformity rank information R2 on the LCD of the first display mechanism 14.

Hereinafter, a configuration of the printing mechanism 15 will be described with reference to FIG. 3. FIG. 3 is a perspective view illustrating an example of the configuration of the printing mechanism 15.

Figure 3:
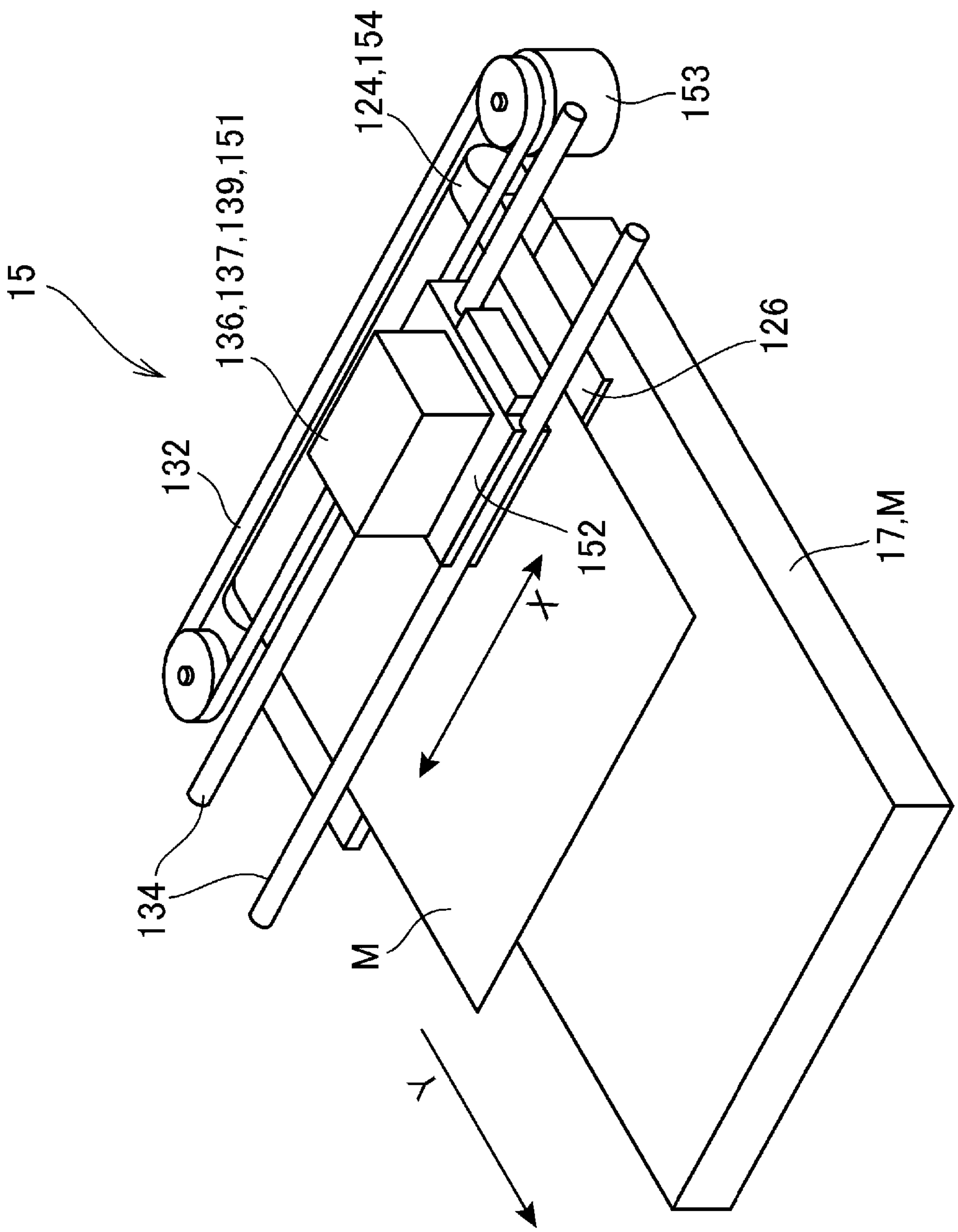
FIG. 3 is a perspective view illustrating an example of a configuration of a printing mechanism.

As illustrated in FIG. 3, the printing mechanism 15 is provided with a printing medium accommodation section 17, a paper feed roller 124, a platen 126, the carriage 152, the scanning motor 153, a towing belt 132, and a guide rail 134.

The paper feed roller 124 is driven by the transport motor 154. The towing belt 132 is driven by the scanning motor 153. The carriage 152 is supported to be movable in the main scanning direction X by the guide rail 134. The carriage 152 is supported by the guide rail 134 and is driven by the scanning motor 153 in the main scanning direction X via the towing belt 132.

A head unit 136 is mounted on the carriage 152.

The head unit 136 includes a plurality of (for example, four) ink cartridges 137 and the printing head 151. The ink cartridges 137 are included in the ink supply section 16.

The plurality of ink cartridges 137 can be attached to and detached from the carriage 152. The inks of different colors are accommodated in the plurality of ink cartridges 137, respectively. For example, cyan (C), magenta (M), yellow (Y), and black (K) inks are accommodated in the ink cartridges 137. The ink accommodated in the ink cartridge 137 is supplied to the printing head 151.

The printing head 151 includes a nozzle 139. A plurality of nozzles 139 are arranged along the sub-scanning direction Y on a surface of the printing head 151 facing the platen 126.

The ink is supplied from the ink cartridge 137 to the nozzle 139. The ink is discharged from the nozzle 139 toward the printing medium M.

The printing medium M is wound around the paper feed roller 124 from the printing medium accommodation section 17 and is transported in the sub-scanning direction Y along a surface of the platen 126. The carriage 152 is towed by the towing belt 132 driven by the scanning motor 153, and moves in the main scanning direction X along the guide rail 134. The printing head 151 mounted on the carriage 152 also moves in the main scanning direction X. Note that the main scanning direction X is a direction orthogonal to the sub-scanning direction Y.

Since the printing mechanism 15 has such a configuration, the printing mechanism 15 alternately repeats a liquid discharge operation of discharging the ink from the nozzle 139 while the printing head 151 moves in the main scanning direction X, and a transport operation of transporting the printing medium M in the sub-scanning direction Y. As a result, the printing mechanism 15 prints an image such as the text or a figure on the printing medium M. That is, the printing mechanism 15 alternately repeats the movement (main scanning) of the printing head 151 in the main scanning direction X and the movement (sub-scanning) of the printing medium M in the sub-scanning direction Y. In addition, by these operations, the printing mechanism 15 arranges rows of dots arranged along the main scanning direction X in the sub-scanning direction Y (sub-scanning direction), and prints the image such as the text or the figure on the printing medium M.

Figure 4:
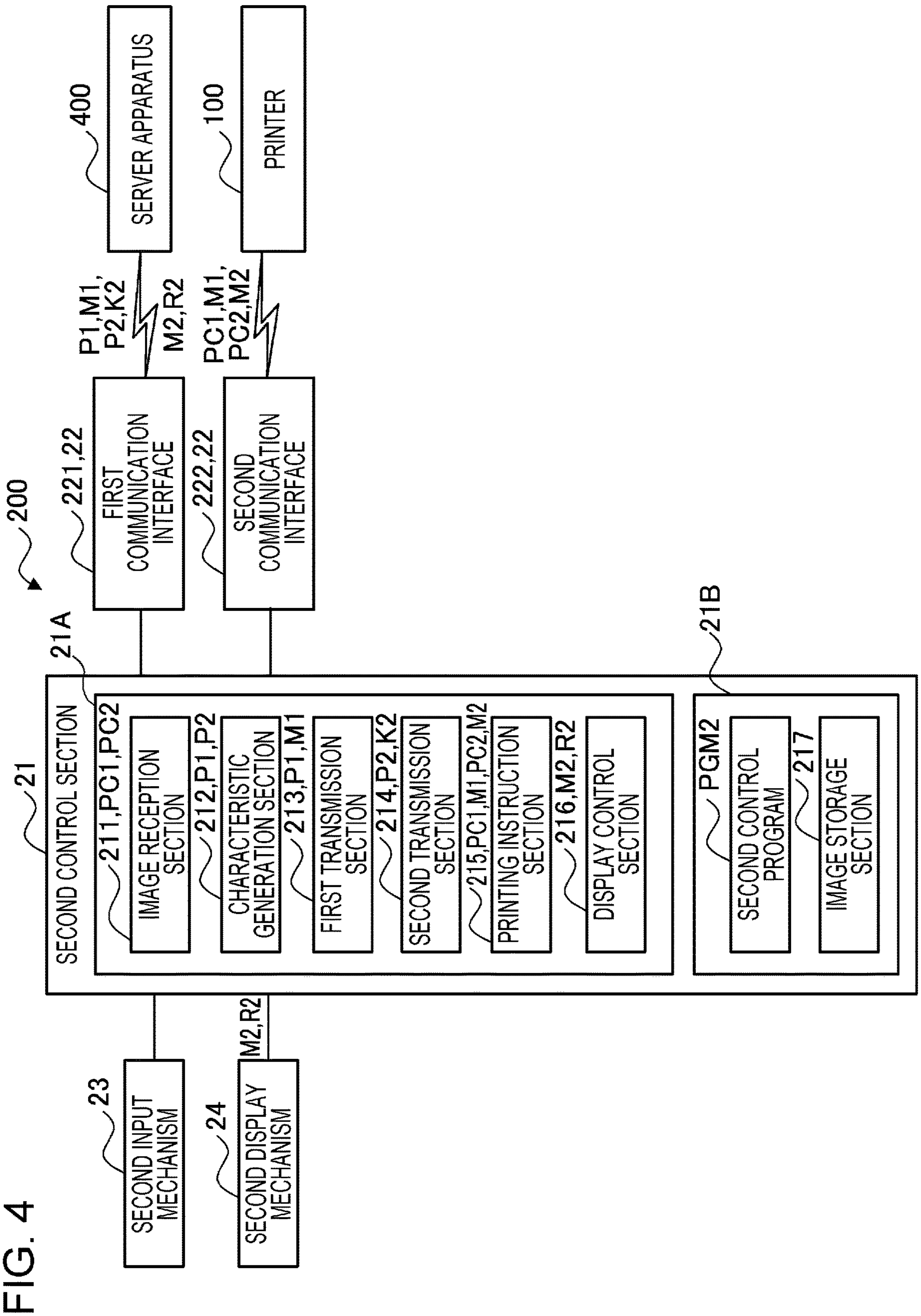
FIG. 4 is a diagram illustrating an example of a configuration of a smartphone according to the present embodiment.

Hereinafter, the configuration of the smartphone 200 will be described with reference to FIG. 4. FIG. 4 is a diagram illustrating an example of the configuration of the smartphone 200 according to the present embodiment.

Note that the configurations of the first smartphone 200A and the second smartphone 200B are substantially the same. Therefore, in the following description, when the first smartphone 200A and the second smartphone 200B are not distinguished from each other, each of the first smartphone 200A and the second smartphone 200B may be referred to as the smartphone 200.

As illustrated in FIG. 4, the smartphone 200 is provided with a second control section 21, a communication interface 22, a second input mechanism 23, and a second display mechanism 24.

The second control section 21 is provided with a second processor 21A such as a CPU and a second memory 21B such as a ROM and a RAM, and controls each of the sections of the smartphone 200. The second memory 21B stores a second control program PGM2. In addition, the second memory 21B may be provided with a semiconductor storage device such as a solid state drive (SSD).

In the second control section 21, the second processor 21A reads out the second control program PGM2 stored in the second memory 21B to execute processing. In other words, the second control section 21 executes the processing by cooperation of hardware and software.

The second processor 21A may be configured with a single processor, or may have a configuration in which a plurality of processors functions as the second processor 21A.

The communication interface 22 is provided with a connector and an interface circuit, and is coupled to the second control section 21. The communication interface 22 is an interface for executing communication with each of the printer 100 and the server apparatus 400. The communication interface 22 includes a first communication interface 221 and a second communication interface 222.

The first communication interface 221 is, for example, an interface for executing communication with a relay center arranged in the network NW connected to the server apparatus 400 in compliance with the Wi-Fi (registered trademark) standard.

The second communication interface 222 is, for example, an interface for executing communication with the printer 100 in compliance with the Wi-Fi (registered trademark) standard.

The second input mechanism 23 is provided with an operation switch provided in the smartphone 200 or an input section such as a touch panel, detects a user's operation to the input section, and outputs a detection signal corresponding to the operation to the second control section 21. The second control section 21 executes the processing corresponding to the user's operation based on the input from the second input mechanism 23.

The second display mechanism 24 is provided with an LCD or the like, and executes display of information on the LCD, and the like in accordance with the control of the second control section 21.

The second display mechanism 24 corresponds to an example of a "second display section".

Hereinafter, functional blocks provided in the second control section 21 of the smartphone 200 will be described. The second control section 21 is provided with, as functional blocks, an image reception section 211, a characteristic generation section 212, a first transmission section 213, a second transmission section 214, a printing instruction section 215, a display control section 216, and an image storage section 217.

The second processor 21A executes the second control program PGM2, so that the second processor 21A functions as the image reception section 211, the characteristic generation section 212, the first transmission section 213, the second transmission section 214, the printing instruction section 215, and the display control section 216. In addition, the second processor 21A executes the second control program PGM2, so that the second control section 21 causes the second memory 21B to function as the image storage section 217.

The second control program PGM2 includes application software that instructs the printer 100 to execute printing.

In the following description, a difference of the functional blocks provided in the second control section 21 of the smartphone 200 from the functional blocks provided in the first control section 11 of the printer 100 described with reference to FIG. 2 will be mainly described.

The image storage section 217 stores the first image PC1 and the second image PC2. The first image PC1 and the second image PC2 are printing target images received by the image reception section 211, and are stored in the image storage section 217 by the image reception section 211.

The image reception section 211 acquires the first image PC1 and the second image PC2 from a camera (not illustrated) provided in the smartphone 200. In addition, the image reception section 211 may access a web site on a server apparatus different from the server apparatus 400 via the first communication interface 221 in compliance with, for example, the Wi-Fi (registered trademark) standard, to receive the first image PC1 and the second image PC2.

In addition, the image reception section 211 stores the first image PC1 and the second image PC2 in the image storage section 217. Note that the second image PC2 is an image received by the image reception section 211 after the analysis information AS is generated by the server apparatus 400.

The characteristic generation section 212 generates the first printing characteristic information P1 indicating the characteristic of the first image PC1. In addition, the characteristic generation section 212 generates the second printing characteristic information P2 indicating the characteristic of the second image PC2.

When an instruction to print the first image PC1 is received from the second input mechanism 23 by the user, the first transmission section 213 transmits the first printing M1 to the server apparatus 400 in association with each other. The first medium information M1 indicates the printing medium M used for printing the first image PC1.

For example, when the instruction to print the first image PC1 is received from the second input mechanism 23 by the user, the first transmission section 213 transmits the first printing characteristic information P1 and the first medium information M1 to the server apparatus 400 in association with each other.

In addition, the first transmission section 213 may transmit the first printing characteristic information P1 and the first medium information M1 to the server apparatus 400 in association with each other each time a preset period elapses. The preset period may be, for example, one day or 10 days. In this case, when the instruction to print the first image PC1 is received from the second input mechanism 23 by the user, the first transmission section 213 stores the first printing M1 in the image storage section 217 in association with each other.

The second transmission section 214 transmits the holding medium information K2 indicating the type of the printing medium M held by the user to the server apparatus 400.

In addition, when an instruction to select the second image PC2 as the printing target is received from the second input mechanism 23 by the user, the second transmission section 214 transmits the second printing characteristic information P2 to the server apparatus 400. For example, when the instruction to select the second image PC2 as the printing target is received from the second input mechanism 23, the second transmission section 214 transmits the second printing characteristic information P2 to the server apparatus 400.

When the printing instruction is received from the second input mechanism 23 by the user, the printing instruction section 215 transmits the instruction to print the first image PC1 and the second image PC2 on the designated printing medium M to the printer 100 via the second communication interface 222.

When the instruction to select the second image PC2 as the printing target is received from the second input mechanism 23 by the user, the display control section 216 receives the second medium information M2 from the server apparatus 400. The display control section 216 displays an image indicating the second medium information M2 on the LCD of the second display mechanism 24.

In addition, when the instruction to select the second image PC2 as the printing target is received from the second input mechanism 23 by the user, the display control section 216 receives the conformity rank information R2 from the server apparatus 400. The display control section 216 displays an image indicating the holding medium information K2 and the conformity rank information R2 on the LCD of the second display mechanism 24.

Figure 5:
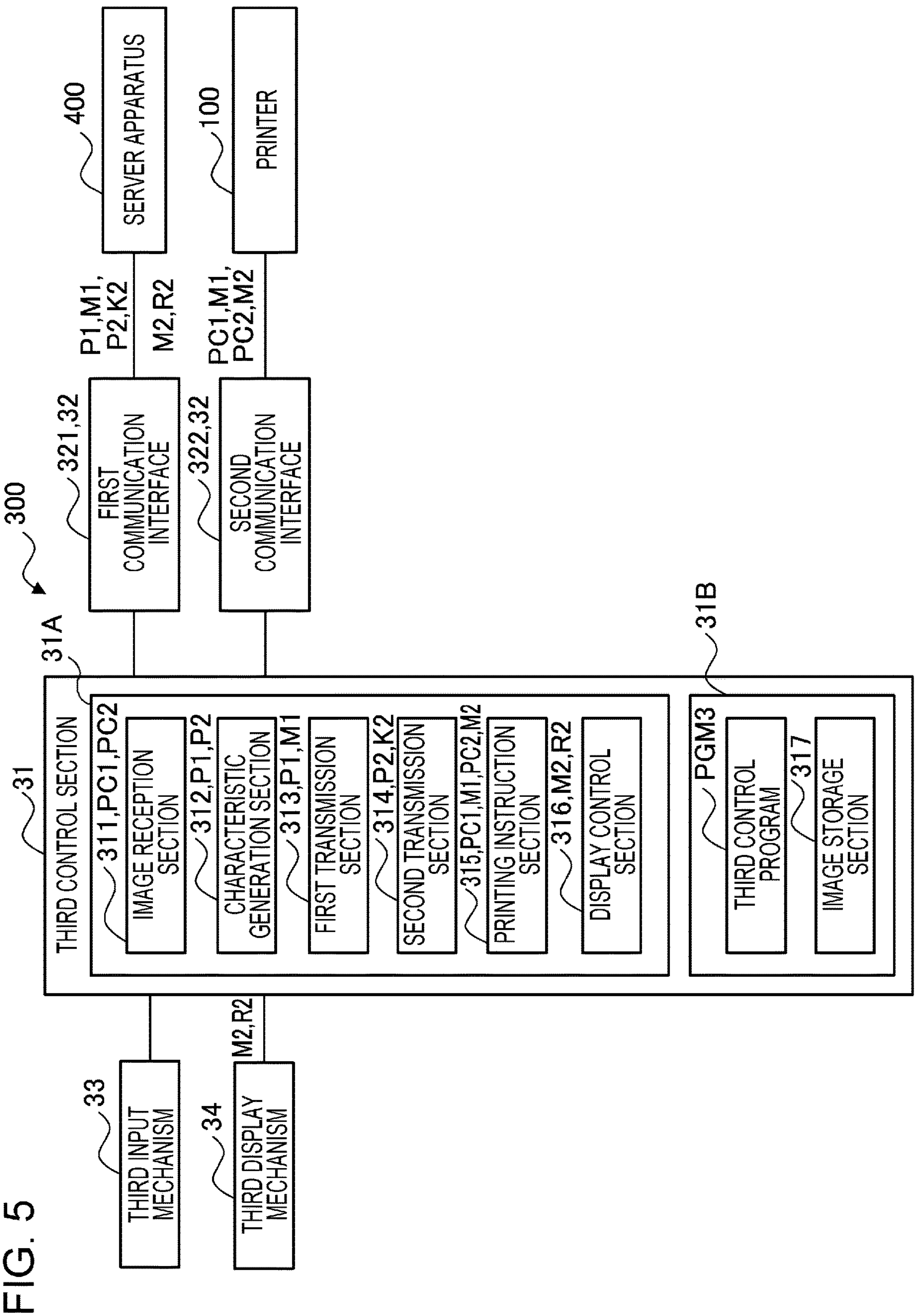
FIG. 5 is a diagram illustrating an example of a configuration of a personal computer according to the present embodiment.

Hereinafter, the configuration of the personal computer 300 will be described with reference to FIG. 5. FIG. 5 is a diagram illustrating an example of the configuration of the personal computer 300 according to the present embodiment.

Note that the configurations of the first personal computer 300A and the second personal computer 300B are substantially the same. Therefore, in the following description, when the first personal computer 300A and the second personal computer 300B are not distinguished from each other, each of the first personal computer 300A and the second personal computer 300B may be referred to as the personal computer 300.

As illustrated in FIG. 5, the personal computer 300 is provided with a third control section 31, a communication interface 32, a third input mechanism 33, and a third display mechanism 34.

The third control section 31 is provided with a third processor 31A such as a CPU and a third memory 31B such as a ROM and a RAM, and controls each of the sections of the personal computer 300. The third memory 31B stores a third control program PGM3. In addition, the third memory 31B may be provided with a magnetic storage device such as a hard disk drive (HDD), or a semiconductor storage device such as a solid state drive (SSD).

In the third control section 31, the third processor 31A reads out the third control program PGM3 stored in the third memory 31B to execute processing. In other words, the third control section 31 executes the processing by cooperation of hardware and software.

The third processor 31A may be configured with a single processor, or may have a configuration in which a plurality of processors functions as the third processor 31A.

The communication interface 32 is provided with a connector and an interface circuit, and is coupled to the third control section 31. The communication interface 32 is an interface for executing communication with each of the printer 100 and the server apparatus 400. The communication interface 32 includes a first communication interface 321 and a second communication interface 322.

The first communication interface 321 is, for example, an interface for executing communication with the server apparatus 400 in compliance with the Ethernet (registered trademark) standard.

The second communication interface 322 is, for example, an interface for executing communication with the printer 100 in compliance with the Ethernet (registered trademark) standard.

The third input mechanism 33 is provided with an input section such as a keyboard or a mouse coupled to the personal computer 300, detects a user's operation to the input section, and outputs a detection signal corresponding to the operation to the third control section 31. The third control section 31 executes the processing corresponding to the user's operation based on the input from the third input mechanism 33.

The third display mechanism 34 is provided with an LCD or the like, and executes display of information on the LCD, and the like in accordance with the control of the third control section 31.

The third display mechanism 34 corresponds to an example of a "second display section".

Hereinafter, functional blocks provided in the third control section 31 of the personal computer 300 will be described. The third control section 31 is provided with, as functional blocks, an image reception section 311, a characteristic generation section 312, a first transmission section 313, a second transmission section 314, a printing instruction section 315, a display control section 316, and an image storage section 317.

The third processor 31A executes the third control program PGM3, so that the third processor 31A functions as an image reception section 311, a characteristic generation section 312, a first transmission section 313, a second transmission section 314, a printing instruction section 315, and a display control section 316. In addition, the third processor 31A executes the third control program PGM3, so that the third control section 31 causes the third memory 31B to function as the image storage section 317.

In the following description, a difference of the functional blocks provided in the third control section 31 of the personal computer 300 from the functional blocks provided in the second control section 21 of the smartphone 200 described with reference to FIG. 4 will be mainly described.

The image storage section 317 stores the first image PC1 and the second image PC2. The first image PC1 and the second image PC2 are printing target images received by the image reception section 311, and are stored in the image storage section 317 by the image reception section 311.

The image reception section 311 may access a web site on a server apparatus different from the server apparatus 400 via the first communication interface 321 in compliance with, for example, the Ethernet (registered trademark) standard, to receive the first image PC1 and the second image PC2. In addition, the image reception section 311 may acquire the first image PC1 and the second image PC2 from a universal serial bus (USB) memory (not illustrated) communicably coupled to the third control section 31 of the personal computer 300.

In addition, the image reception section 311 stores the first image PC1 and the second image PC2 in the image storage section 317. Note that the second image PC2 is an image received by the image reception section 311 after the analysis information AS is generated by the server apparatus 400.

The characteristic generation section 312 generates the first printing characteristic information P1 indicating the characteristic of the first image PC1. In addition, the characteristic generation section 312 generates the second printing characteristic information P2 indicating the characteristic of the second image PC2.

When an instruction to print the first image PC1 is received from the third input mechanism 33 by the user, the first transmission section 313 transmits the first printing M1 to the server apparatus 400 in association with each other. The first medium information M1 indicates the printing medium M used for printing the first image PC1.

For example, when the instruction to print the first image PC1 is received from the third input mechanism 33 by the user, the first transmission section 313 transmits the first printing characteristic information P1 and the first medium information M1 to the server apparatus 400 in association with each other.

In addition, the first transmission section 313 may transmit the first printing characteristic information P1 and the first medium information M1 to the server apparatus 400 in association with each other each time a preset period elapses. The preset period may be, for example, one day or 10 days. In this case, when the instruction to print the first image PC1 is received from the third input mechanism 33 by the user, the first transmission section 313 stores the first printing M1 in the image storage section 317 in association with each other.

The second transmission section 314 transmits the holding medium information K2 indicating the type of the printing medium M held by the user to the server apparatus 400.

In addition, when an instruction to select the second image PC2 as the printing target is received from the third input mechanism 33 by the user, the second transmission section 314 transmits the second printing characteristic information P2 to the server apparatus 400. For example, when the instruction to select the second image PC2 as the printing target is received from the third input mechanism 33 by the user, the second transmission section 314 transmits the second printing characteristic information P2 to the server apparatus 400.

When the printing instruction is received from the third input mechanism 33 by the user, the printing instruction section 315 transmits the instruction to print the first image PC1 and the second image PC2 on the designated printing medium M to the printer 100 via the second communication interface 322. In addition, the printing instruction section 315 instructs the printer 100 to execute printing by communicating with a driver arranged in the printer 100.

When the instruction to select the second image PC2 as the printing target is received from the third input mechanism 33 by the user, the display control section 316 receives the second medium information M2 from the server apparatus 400. The display control section 316 displays an image indicating the second medium information M2 on the LCD of the third display mechanism 34.

In addition, when the instruction to select the second image PC2 as the printing target is received from the third input mechanism 33 by the user, the display control section 316 receives the conformity rank information R2 from the server apparatus 400. The display control section 316 displays an image indicating the holding medium information K2 and the conformity rank information R2 on the LCD of the third display mechanism 34.

Figure 6:
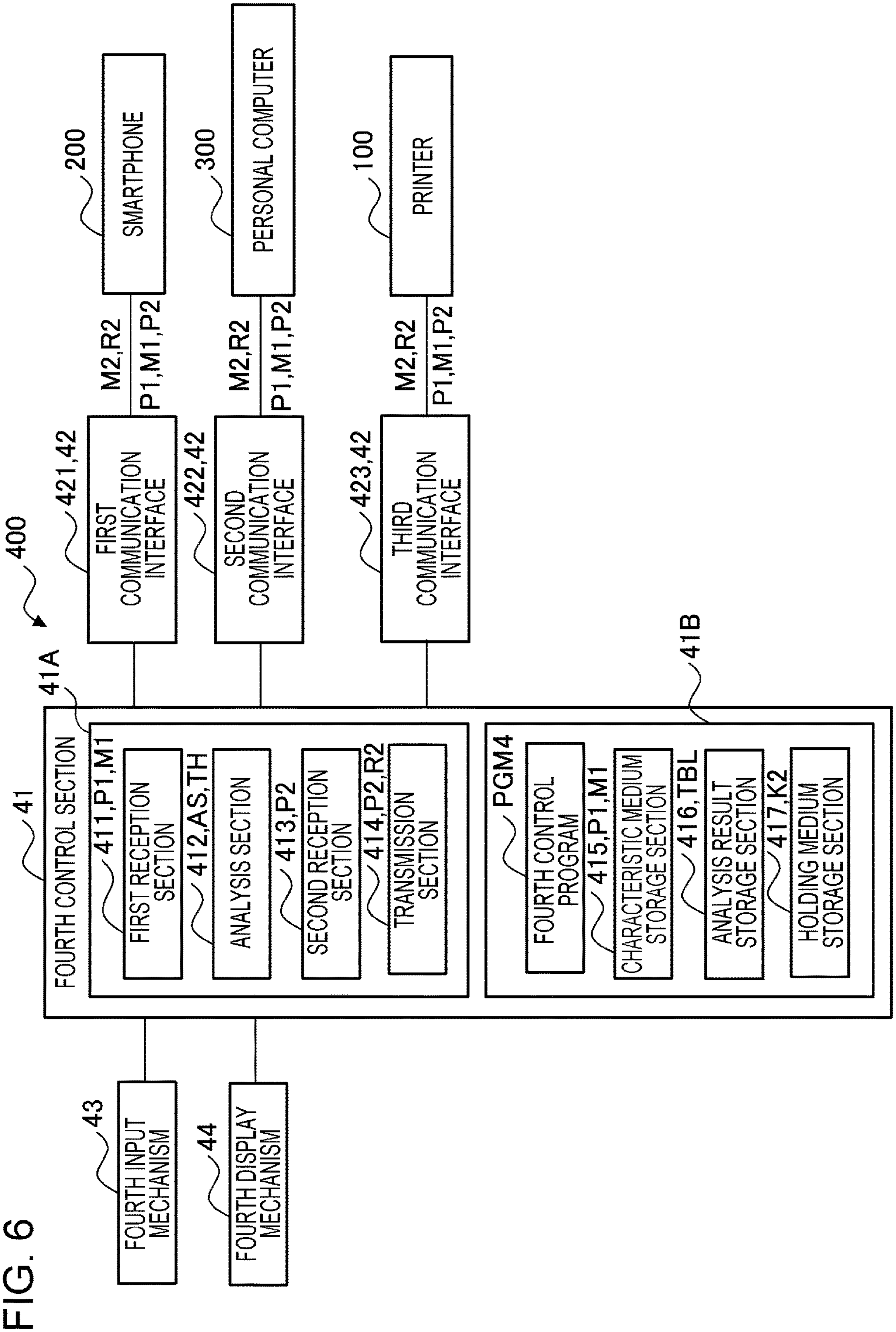
FIG. 6 is a diagram illustrating an example of a configuration of a server apparatus according to the present embodiment.

Hereinafter, the configuration of the server apparatus 400 will be described with reference to FIG. 6. FIG. 6 is a diagram illustrating an example of the configuration of the server apparatus 400 according to the present embodiment.

As illustrated in FIG. 6, the server apparatus 400 is provided with a fourth control section 41, a communication interface 42, a fourth input mechanism 43, and a fourth display mechanism 44.

The fourth control section 41 is provided with a fourth processor 41A such as a CPU and a fourth memory 41B such as a ROM and a RAM, and controls each of the sections of the server apparatus 400. The fourth memory 41B stores a fourth control program PGM4. In addition, the fourth memory 41B may be provided with a magnetic storage device such as an HDD, or a semiconductor storage device such as an SSD.

In the fourth control section 41, the fourth processor 41A reads out the fourth control program PGM4 stored in the fourth memory 41B to execute processing. In other words, the fourth control section 41 executes the processing by cooperation of hardware and software.

The fourth processor 41A may be configured with a single processor, or may have a configuration in which a plurality of processors functions as the fourth processor 41A.

In the present embodiment, the fourth processor 41A executes the fourth control program PGM4 to control each of the sections of the server apparatus 400, but the present disclosure is not limited to this. The fourth control section 41 may be provided with, for example, an ASIC, and the ASIC may execute processing by an installed function. In addition, the fourth control section 41 may be provided with, for example, a signal processing circuit, and the signal processing circuit may execute signal processing to execute the processing.

The communication interface 42 is provided with a connector and an interface circuit, and is coupled to the fourth control section 41. The communication interface 42 is an interface for executing communication with each of the smartphone 200, the personal computer 300, and the printer 100. The communication interface 42 includes a first communication interface 421, a second communication interface 422, and a third communication interface 423.

The first communication interface 421 is, for example, an interface for executing communication with the smartphone 200 in compliance with the Ethernet (registered trademark) standard. The first communication interface 421 communicates with the smartphone 200 via the network NW. The first communication interface 421 communicates with the network NW in compliance with the Ethernet (registered trademark) standard, and the smartphone 200 communicates with a relay center arranged in the network NW in compliance with, for example, the Wi-Fi (registered trademark) standard.

The second communication interface 422 is, for example, an interface for executing communication with the personal computer 300 in compliance with the Ethernet (registered trademark) standard.

The third communication interface 423 is, for example, an interface for executing communication with the printer 100 in compliance with the Ethernet (registered trademark) standard.

The fourth input mechanism 43 is provided with an input section such as a keyboard or a mouse coupled to the server apparatus 400, detects a user's operation to the input section, and outputs a detection signal corresponding to the operation to the fourth control section 41. The fourth control section 41 executes the processing corresponding to the user's operation based on the input from the fourth input mechanism 43. The user is, for example, a manager of the server apparatus 400.

The fourth display mechanism 44 is provided with a plurality of LEDs, LCD, and the like, and executes turning on, turning off, and blinking of the LEDs in a predetermined aspect, and display of information on the LCD, and the like in accordance with the control of the fourth control section 41.

Hereinafter, functional blocks provided in the fourth control section 41 of the server apparatus 400 will be described.

The fourth control section 41 is provided with, as functional blocks, a first reception section 411, an analysis section 412, a second reception section 413, a transmission section 414, a characteristic medium storage section 415, an analysis result storage section 416, and a holding medium storage section 417.

The fourth processor 41A executes the fourth control program PGM4, so that the fourth processor 41A functions as the first reception section 411, the analysis section 412, the second reception section 413, and the transmission section 414. In addition, the fourth processor 41A executes the fourth control program PGM4, so that the fourth control section 41 causes the fourth memory 41B to function as the characteristic medium storage section 415, the analysis result storage section 416, and the holding medium storage section 417.

The characteristic medium storage section 415 stores each of the plurality of pieces of first printing characteristic information P1 and each of the plurality of pieces of first medium information M1, which are received from the smartphone 200, the personal computer 300, and the printer 100, in association with each other. The plurality of pieces of first printing characteristic information P1 and the plurality of pieces of first medium information M1 are received from the smartphone 200, the personal computer 300, and the printer 100 by the first reception section 411, and are stored in the characteristic medium storage section 415 by the first reception section 411.

The analysis result storage section 416 stores the analysis information AS indicating an analysis result of the relationship between the first printing characteristic information P1 and the first medium information M1. The analysis information AS is stored in the analysis result storage section 416, for example, as an analysis result table TBL in which a printing characteristic PS and conformable paper MS are associated with each other.

The analysis information AS is generated as the analysis result by the analysis section 412, and is stored in the analysis result storage section 416 as the analysis result table TBL by the analysis section 412.

The analysis result table TBL will be further described with reference to FIG. 7.

The holding medium information K2 is stored in the holding medium storage section 417 in association with identification information of the smartphone 200, the personal computer 300, and the printer 100. The holding medium information K2 indicates the type of the printing medium M held by the user.

The holding medium information K2 is received from the smartphone 200, the personal computer 300, and the printer 100 by the second reception section 413, and is stored in the holding medium storage section 417 by the second reception section 413.

The first reception section 411 receives the plurality of pieces of first printing characteristic information P1 and the plurality of pieces of first medium information M1 from each of the smartphone 200, the personal computer 300, and the printer 100. The first reception section 411 stores each of the plurality of pieces of first printing characteristic information P1 and each of the plurality of pieces of first medium information M1, which are received, in the characteristic medium storage section 415 in association with each other.

The analysis section 412 generates the analysis information AS by analyzing the relationship between the plurality of pieces of first printing characteristic information P1 and the plurality of pieces of first medium information M1. In addition, the analysis section 412 stores the analysis information AS indicating the analysis result in the analysis result storage section 416 as the analysis result table TBL.

The analysis section 412 analyzes, for example, the relationship between the plurality of pieces of first printing characteristic information P1 and the plurality of pieces of first medium information M1 by using, for example, a statistical method. The analysis section 412 analyzes, for example, the relationship between the plurality of pieces of first printing characteristic information P1 and the plurality of pieces of first medium information M1 by obtaining a correlation coefficient between each characteristic information constituting the first printing characteristic information P1 and the plurality of pieces of first medium information M1.

In addition, for example, when the number of pieces of first printing characteristic information P1 stored in the characteristic medium storage section 415 is equal to or more than a threshold number TH, the analysis section 412 analyzes the relationship between the plurality of pieces of first printing characteristic information P1 and the plurality of pieces of first medium information M1. The threshold number TH is, for example, 100. In addition, the threshold number TH may be, for example, 1000. As the number of pieces of first printing characteristic information P1 used for the analysis is larger, more appropriate analysis result can be generated.

The second reception section 413 receives the second printing characteristic information P2 from each of the smartphone 200, the personal computer 300, and the printer 100.

In addition, the second reception section 413 receives the holding medium information K2 from each of the smartphone 200, the personal computer 300, and the printer 100. The holding medium information K2 indicates the type of the printing medium M held by the user.

The transmission section 414 determines the second medium information M2 indicating the printing medium M conforming to the second printing characteristic information P2 based on the analysis information AS, to transmit the determined second medium information M2 to the smartphone 200, the personal computer 300, and the printer 100.

In addition, the transmission section 414 generates the conformity rank information R2 based on the analysis information AS and the holding medium information K2, and transmits the generated conformity rank information R2 to the smartphone 200, the personal computer 300, and the printer 100. The conformity rank information R2 indicates the rank in which each of the plurality of print media M indicated by the holding medium information K2 conforms to the second printing characteristic information P2. Note that the smartphone 200, the personal computer 300, and the printer 100 to which the transmission section 414 transmits the conformity rank information R2 correspond to the identification information stored in the holding medium storage section 417 in association with the holding medium information K2.

Hereinafter, the analysis result table TBL will be described with reference to FIG. 7. FIG. 7 is a diagram illustrating an example of the analysis result table TBL generated by the server apparatus 400. The analysis result table TBL illustrated in FIG. 7 is generated by the analysis section 412 of the server apparatus 400 when the first image PC1 and the second image PC2 are photo images.

As illustrated in FIG. 7, the analysis result table TBL associates the printing characteristic PS described in the left column of FIG. 7 with the conformable paper MS described in the right column of FIG. 7.

The printing characteristic PS indicates the color tone of the second image PC2. The printing characteristic PS includes a high-key tone, a low-key tone, a POP tone, and a monochrome sepia tone. The high-key tone indicates that the image is a bright image. The low-key tone indicates that the image is a dark image. The POP tone indicates that the color is vivid. The monochrome sepia tone indicates that the chroma saturation is low, that is, the color is close to an achromatic color.

The conformable paper MS includes glossy photo paper, high-glossy (CRISPIA) photo paper, silk tone photo paper, photo matte paper, drawing material paper, fine art paper, and Japanese paper.

As illustrated in FIG. 7, for example, when the printing characteristic PS of the second image PC2 is the high-key tone, the glossy photo paper and the silk tone photo paper are described as the conformable paper MS.

In addition, for example, when the printing characteristic PS of the second image PC2 is the low-key tone, the high-glossy (CRISPIA) photo paper and the photo matte paper are described as the conformable paper MS.

Hereinafter, a paper display screen 460 displayed on the LCD of the first display mechanism 14 when the printer 100 prints the second image PC2 will be described with reference to FIG. 8. Note that, in FIG. 8, a case in which the type of the printing medium M held by the user is not stored in the holding medium storage section 417 of the server apparatus 400 will be described.

Figure 8:
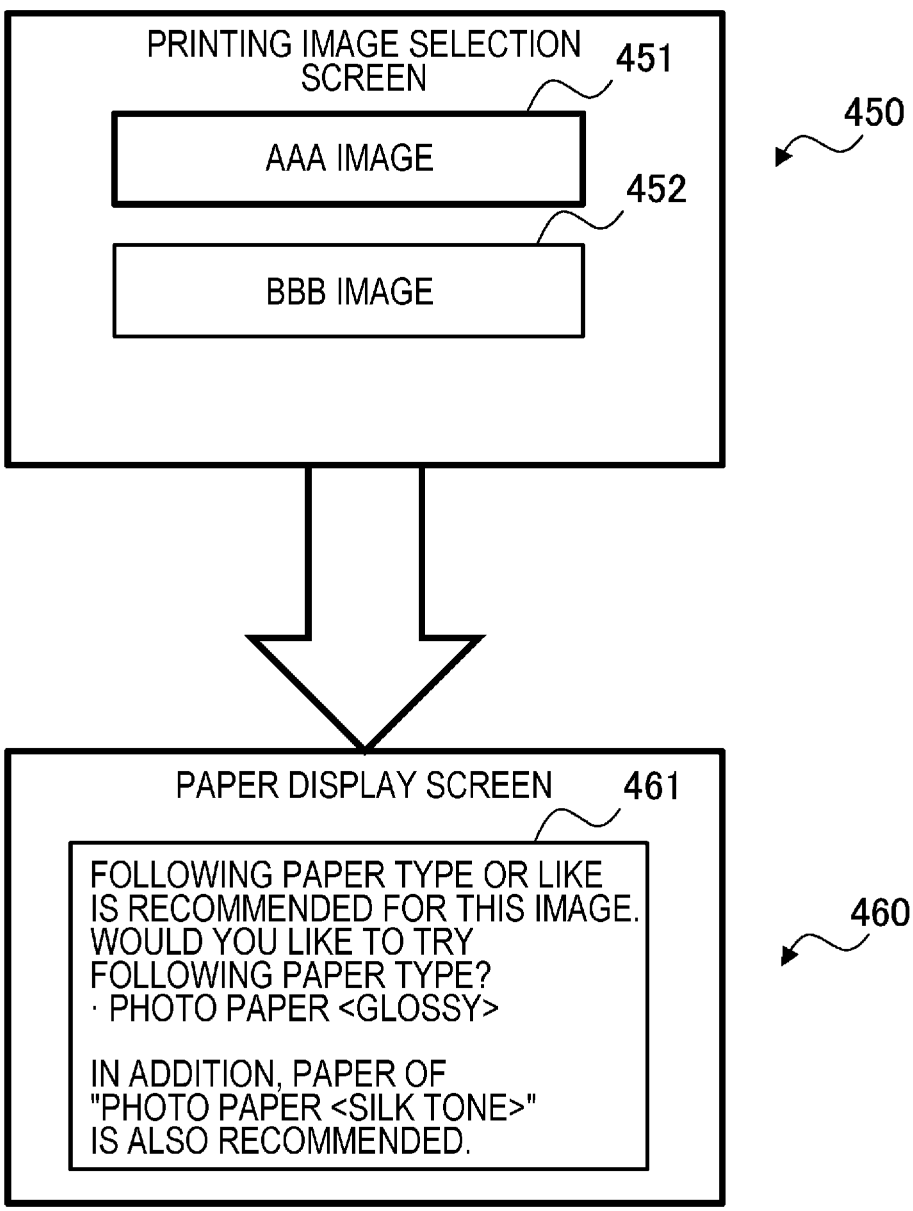
FIG. 8 is a screen view illustrating an example of a paper display screen.

A printing image selection screen 450 is illustrated at the upper portion of FIG. 8. The printing image selection screen 450 is displayed on the LCD of the first display mechanism 14 when the user selects the image to be printed. A first button 451 and a second button 452 are displayed on the printing image selection screen 450.

The first button 451 is touch-operated by the user when selecting an “AAA image”. The second button 452 is touch-operated by the user when a “BBB image” is selected.

When the first button 451 is touch-operated by the user, the image reception section 111 receives the “AAA image”

as the second image PC2. The characteristic generation section 112 generates the second printing characteristic information P2 indicating the characteristic of the "AAA image" as the second image PC2. In addition, the second transmission section 114 transmits the second printing characteristic information P2 to the server apparatus 400.

The second reception section 413 of the server apparatus 400 receives the second printing characteristic information P2 from the printer 100. The transmission section 414 determines the second medium information M2 indicating the printing medium M conforming to the second printing characteristic information P2 based on the analysis information AS, and transmits the determined second medium information M2 to the printer 100. In FIG. 8, a case in which the second printing characteristic information P2 is the "high-key tone" of FIG. 7 will be described.

A paper display screen 460 is illustrated at the lower portion of FIG. 8. The paper display screen 460 is displayed on the LCD of the first display mechanism 14 by the display control section 116 of the printer 100. The paper display screen 460 corresponds to an example of the "image indicating the second medium information M2".

The paper display screen 460 includes a recommended paper display portion 461. On the recommended paper display portion 461, the second medium information M2 is displayed as a recommended paper type. For example, on the recommended paper display portion 461, "The following paper type or the like is recommended for this image. Would you like to try the following paper type?·Photo paper <glossy>" is displayed, and a fact that the photo paper <glossy> is the recommended paper is displayed.

In addition, on the recommended paper display portion 461, "In addition, the paper of "photo paper <silk tone>" is also recommended." is displayed, and a fact that the photo paper <silk tone> is also the recommended paper is displayed.

As described with reference to FIG. 8, when the second image PC2 is selected in the printer 100, the paper display screen 460 is displayed, and thus the user can easily check the paper type conforming to the second printing characteristic information P2. Therefore, the convenience of the user can be improved.

Figure 9:
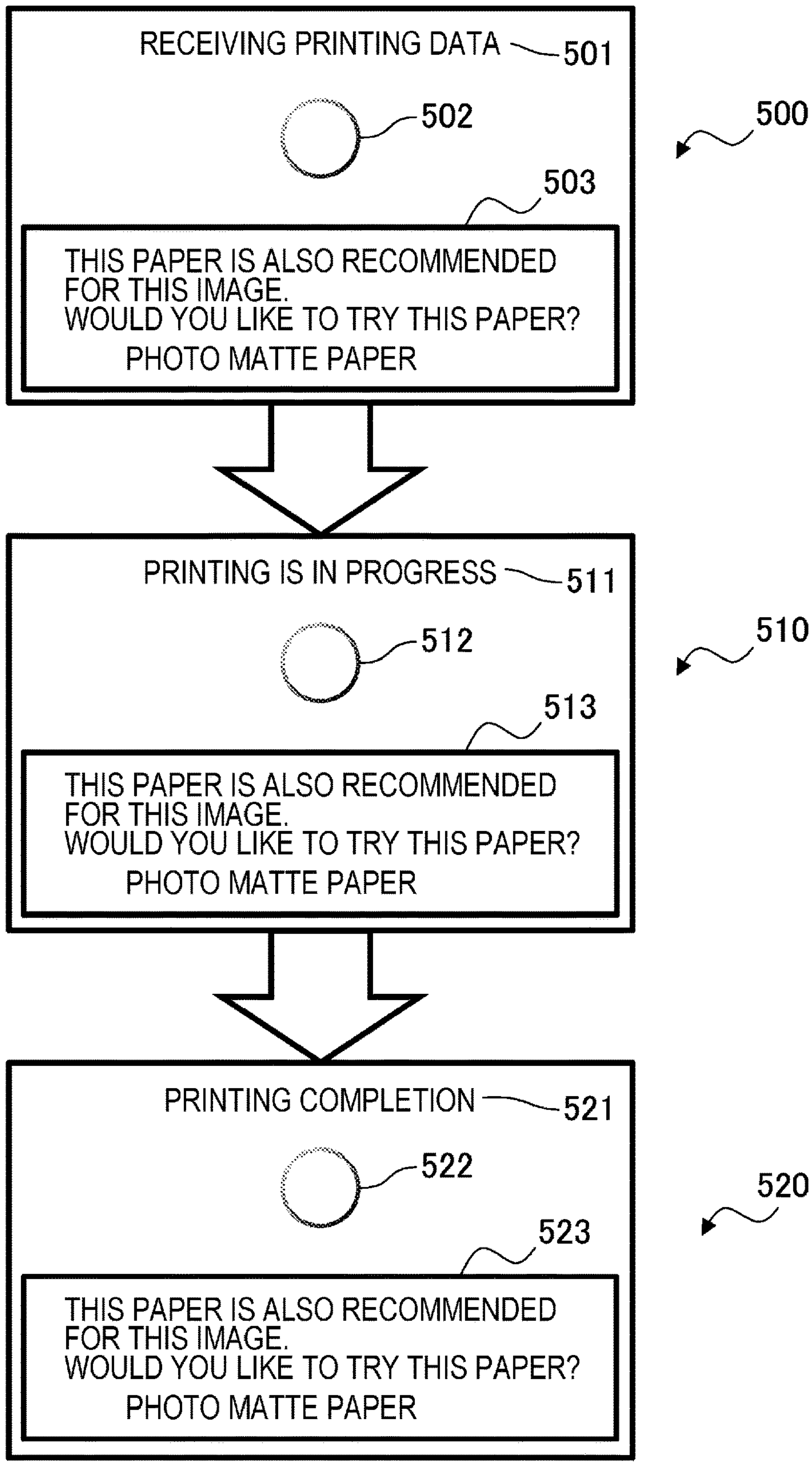
FIG. 9 is a screen view illustrating an example of a printing screen displayed during printing by the printer.

Hereinafter, a printing screen displayed on the LCD of the first display mechanism 14 during printing by the printer 100 will be described with reference to FIG. 9. FIG. 9 is a screen view illustrating an example of the printing screen displayed during printing by the printer 100. In FIG. 9, for example, a case in which the user registers a printing job in the printer 100 by using the smartphone 200 and the user executes the registered printing job from the smartphone 200 by using the printer 100 will be described.

A first printing screen 500 is illustrated at the upper portion of FIG. 9. The first printing screen 500 is displayed when the printer 100 is receiving printing data from the smartphone 200. The first printing screen 500 includes a title display portion 501, a mark display portion 502, and a recommended medium display portion 503.

On the title display portion 501, a text image of "receiving printing data" indicating that the printing data is being received is displayed.

On the mark display portion 502, a mark indicating that printing is in progress is displayed.

On the recommended medium display portion 503, a text image of "This paper is also recommended for this image. Would you like to try this paper? Photo matte paper" indicating that the "photo matte paper" is recommended is displayed.

The display control section 116 receives, for example, the second medium information M2, and displays the first printing screen 500 when the second medium information M2 includes the "photo matte paper", and the printing medium M included in the printing job registered in the printer 100 by the user is not the "photo matte paper".

In addition, the display control section 116 displays, for example, the first printing screen 500 when the holding medium information K2 does not include "photo matte paper".

A second printing screen 510 is illustrated in the middle portion of FIG. 9. The second printing screen 510 is displayed when the printer 100 is executing printing. The second printing screen 510 includes a title display portion 511, a mark display portion 512, and a recommended medium display portion 513.

On the title display portion 511, a text image of "printing is in progress" indicating that printing is being executed is displayed.

On the mark display portion 512, a mark indicating that printing is in progress is displayed.

On the recommended medium display portion 513, the same text image as the text image of the recommended medium display portion 503 is displayed.

When the first printing screen 500 is displayed by the display control section 116, the second printing screen 510 is displayed after the first printing screen 500.

A third printing screen 520 is illustrated at the lower portion of FIG. 9. The third printing screen 520 is displayed when the printer 100 completes the execution of printing. The third printing screen 520 includes a title display portion 521, a mark display portion 522, and a recommended medium display portion 523.

On the title display portion 521, a text image of "printing completion" indicating that the execution of printing is completed is displayed.

On the mark display portion 522, a mark indicating that the execution of printing is completed is displayed.

On the recommended medium display portion 523, the same text image as the text image of the recommended medium display portion 503 is displayed.

When the first printing screen 500 is displayed by the display control section 116, the third printing screen 520 is displayed after the second printing screen 510.

In FIG. 9, a case in which the first printing screen 500, the second printing screen 510, and the third printing screen 520 are displayed on the first display mechanism 14 of the printer 100 will be described, but the present disclosure is not limited to this. The first printing screen 500, the second printing screen 510, and the third printing screen 520 may be displayed, for example, on the second display mechanism 24 of the smartphone 200. In addition, the first printing screen 500, the second printing screen 510, and the third printing screen 520 may be displayed on, for example, the third display mechanism 34 of the personal computer 300.

As described with reference to FIG. 9, since the first printing screen 500, the second printing screen 510, and the third printing screen 520 are displayed on the first display mechanism 14 of the printer 100, the user who operates the printer 100 can check the recommended printing medium M during printing. Therefore, the convenience of the user can be improved.

Hereinafter, a paper display screen 560 displayed on the LCD of the first display mechanism 14 when the printer 100 prints the second image PC2 will be described with reference to FIG. 10. Note that, in FIG. 10, a case in which the type of the printing medium M held by the user is stored in the holding medium storage section 417 of the server apparatus 400 will be described.

Figure 10:
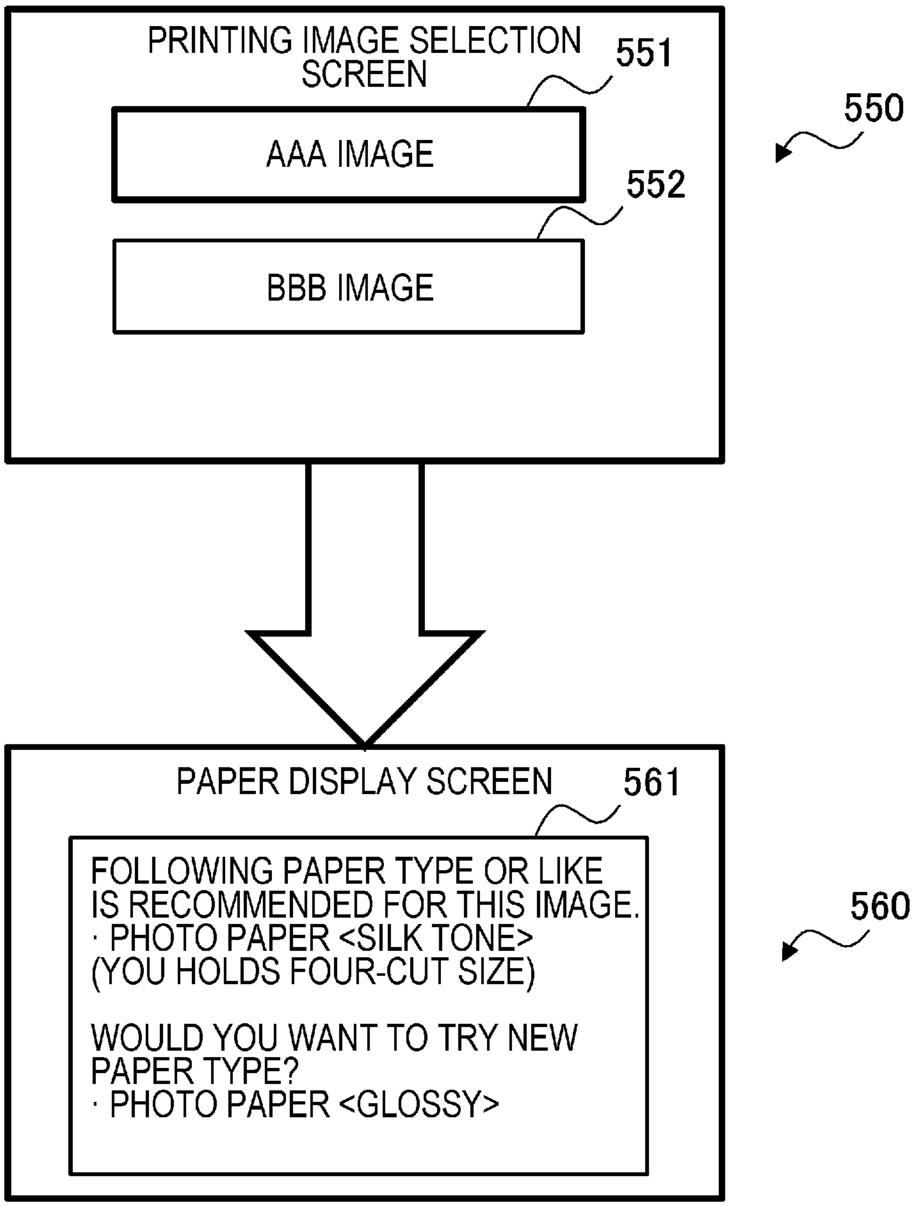
FIG. 10 is a screen view illustrating another example of the paper display screen.

A printing image selection screen 550 is illustrated at the upper portion of FIG. 10. The printing image selection screen 550 is displayed on the LCD of the first display mechanism 14 when the user selects the image to be printed. A first button 551 and a second button 552 are displayed on the printing image selection screen 550.

The first button 551 is touch-operated by the user when selecting an "AAA image". The second button 552 is touch-operated by the user when a "BBB image" is selected.

When the first button 551 is touch-operated by the user, the image reception section 111 receives the "AAA image" as the second image PC2. The characteristic generation section 112 generates the second printing characteristic information P2 indicating the characteristic of the "AAA image" as the second image PC2. In addition, the second transmission section 114 transmits the second printing characteristic information P2 to the server apparatus 400.

The second reception section 413 of the server apparatus 400 receives the second printing characteristic information P2 from the printer 100. The transmission section 414 generates the conformity rank information R2 based on the analysis information AS and the holding medium information K2, and transmits the generated conformity rank information R2 to the printer 100. In FIG. 10, a case in which the second printing characteristic information P2 is the "high-key tone" of FIG. 7 will be described. In addition, a case in which the user holds paper of the photo paper <silk tone> and holds paper of the photo paper <glossy> will be described. In this case, the holding medium information K2 includes information indicating the photo paper <silk tone> and does not include information indicating the photo paper <glossy>.

A paper display screen 560 is illustrated at the lower portion of FIG. 8. The paper display screen 560 is displayed on the LCD of the first display mechanism 14 by the display control section 116 of the printer 100. The paper display screen 560 corresponds to an example of the "image indicating the holding medium information K2 and the conformity rank information R2".

The paper display screen 560 includes a recommended paper display portion 561. The holding medium information K2 and the conformity rank information R2 are displayed on the recommended paper display portion 561 as the recommended paper type. For example, on the recommended paper display portion 561, "The following paper type or the like is recommended for this image. •Photo paper <silk tone>" (You holds a four-cut size)" is displayed, and a fact that the photo paper <silk tone> for which the user holds a four-cut size is the recommended paper is displayed.

In addition, on the recommended paper display portion 561, "Would you want to try a new paper type?. Photo paper <glossy>" is displayed, and a fact that the photo paper <glossy> that is not held by the user is also the recommended paper is displayed.

As described with reference to FIG. 10, when the second image PC2 is selected in the printer 100, the paper display screen 560 is displayed, and thus the user can easily check the paper type conforming to the second printing characteristic information P2 out of the paper held by the user. Therefore, the convenience of the user can be improved. In addition, since the paper type that is not held by the user and that conforms to the second printing characteristic information P2 is displayed, the user can check that there is a paper type conforming to printing of the second image PC2 even in the paper type that is not held by the user. Therefore, the convenience of the user can be improved.

Figure 11:
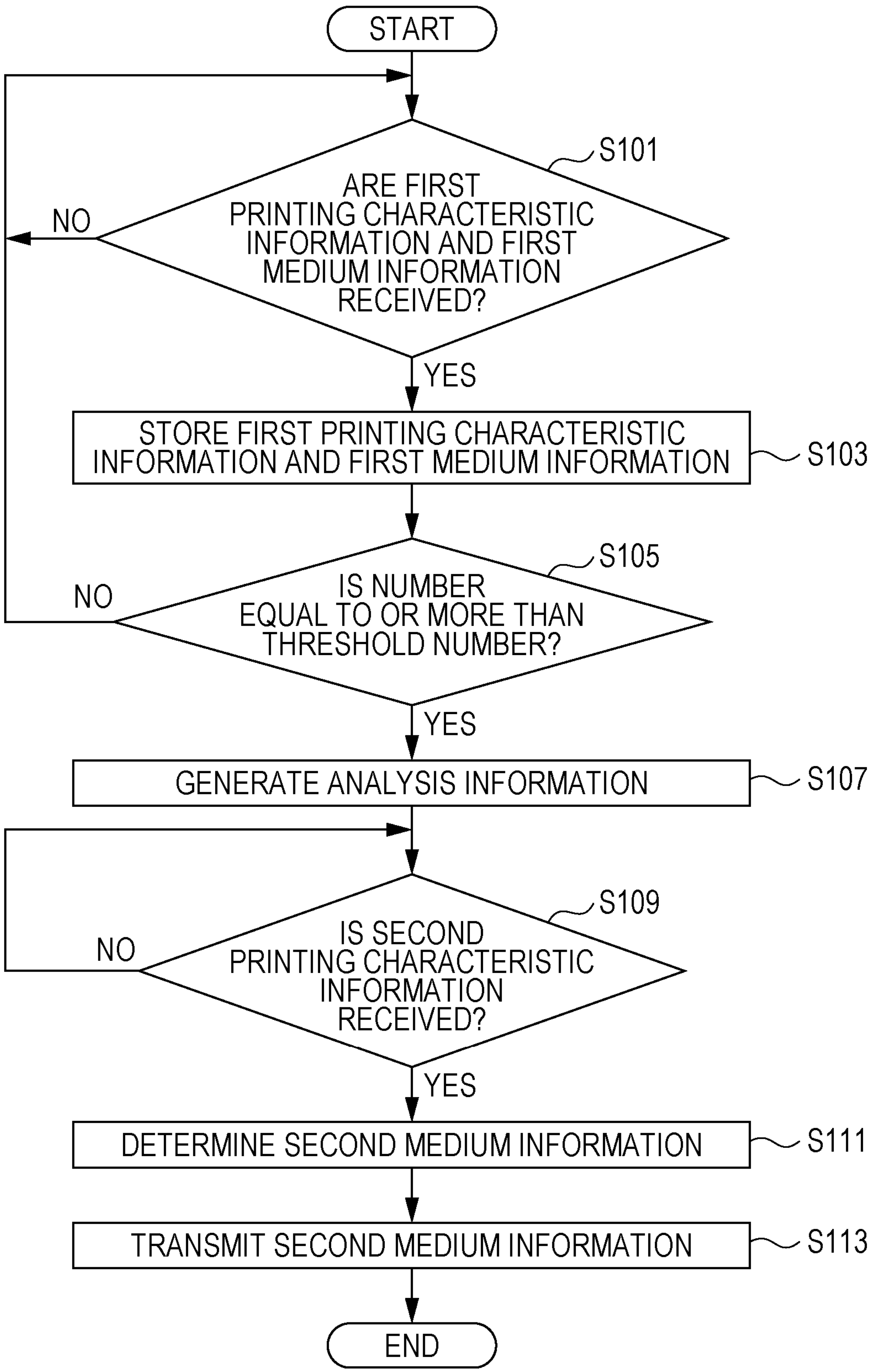
FIG. 11 is a flowchart illustrating an example of processing of the server apparatus.

Hereinafter, an example of processing of the fourth control section 41 of the server apparatus 400 will be described with reference to FIG. 11. FIG. 11 is a flowchart illustrating an example of the processing of the fourth control section 41 of the server apparatus 400.

As illustrated in FIG. 11, in step S101, the first reception section 411 determines whether or not the first printing characteristic information P1 and the first medium information M1 are received from the smartphone 200, the personal computer 300, or the printer 100.

When the first reception section 411 determines that the first printing characteristic information P1 and the first medium information M1 are not received (step S101; NO), the processing is in a standby state. When the first reception section 411 determines that the first printing characteristic information P1 and the first medium information M1 are received (step S101; YES), the processing proceeds to step S103.

In step S103, the first reception section 411 stores the first printing characteristic information P1 and the first medium information M1 in the characteristic medium storage section 415 in association with each other.

Then, in step S105, the analysis section 412 determines whether or not the number of pieces of first printing characteristic information P1 stored in the characteristic medium storage section 415 is equal to or more than the threshold number TH.

When the analysis section 412 determines that the number of pieces of first printing characteristic information P1 is not equal to or more than the threshold number TH (step S105; NO), the processing returns to step S101. When the analysis section 412 determines that the number of pieces of first printing characteristic information P1 is equal to or more than the threshold number TH (step S105; YES), the processing proceeds to step S107.

In step S107, the analysis section 412 generates the analysis information AS by analyzing the relationship between the plurality of pieces of first printing characteristic information P1 and the plurality of pieces of first medium information M1, which are stored in the characteristic medium storage section 415.

Then, in step S109, the second reception section 413 determines whether or not the second printing characteristic information P2 is received from the smartphone 200, the personal computer 300, or the printer 100.

When the second reception section 413 determines that the second printing characteristic information P2 is not received (step S109; NO), the processing is in a standby state. When the second reception section 413 determines that the second printing characteristic information P2 is received (step S109; YES), the processing proceeds to step S111.

In step S111, the transmission section 414 determines the second medium information M2 indicating the printing medium M conforming to the second printing characteristic information P2 based on the analysis information AS.

Then, in step S113, the transmission section 414 transmits the determined second medium information M2 to the smartphone 200, the personal computer 300, or the printer 100. Thereafter, the processing ends.

As described with reference to FIG. 11, the second medium information M2 indicating the printing medium M conforming to the second printing characteristic information P2 is transmitted to the smartphone 200, the personal computer 300, or the printer 100. Therefore, the smartphone 200, the personal computer 300, or the printer 100 can display the second medium information M2 indicating the printing medium M conforming to the second printing characteristic information P2. Therefore, the user can check the second medium information M2. As a result, the user can select the printing medium M conforming to the second image PC2 when printing the second image PC2 corresponding to the second printing characteristic information P2.

In addition, since the first printing characteristic information P1 and the second printing characteristic information P2 are transmitted to the server apparatus 400 instead of transmitting the first image PC1 and the second image PC2 to the server apparatus 400, the leakage of the first image PC1 and the second image PC2 can be suppressed. That is, a case in which the first image PC1 and the second image PC2 included in personal information are viewed by another person other than the user and are acquired by another person can be suppressed.

Hereinbefore, as described above with reference to FIGS. 1 to 11, the printing system 1 according to the present embodiment includes the printer 100 including the first display mechanism 14, the smartphone 200 including the second display mechanism 24, the personal computer 300 including the third display mechanism 34, and the server apparatus 400 communicably connected to the printer 100, the smartphone 200, and the personal computer 300, in which at least one of the printer 100, the smartphone 200, and the personal computer 300 generates the first printing characteristic information P1 indicating the characteristic of the first image PC1 for which the user gives the printing instruction, to transmit the first printing characteristic information P1 and the first medium information M1 indicating the printing medium M used for printing to the server apparatus 400, the server apparatus 400 stores the plurality of pieces of first printing characteristic information P1 and the plurality of pieces of first medium information M1 in association with each other, to generate the analysis information AS by analyzing the relationship between the plurality of pieces of first printing characteristic information P1 and the plurality of pieces of first medium information M1, at least one of the printer 100, the smartphone 200, and the personal computer 300 generates the second printing characteristic information P2 indicating the characteristic of the second image PC2 different from the first image PC1 when the user gives the instruction to print the second image PC2, to transmit the second printing characteristic information P2 to the server apparatus 400, the server apparatus 400 determines the second medium information M2 indicating the printing medium M conforming to the second printing characteristic information P2 based on the analysis information AS, to transmit the second medium information M2 to at least one of the printer 100, the smartphone 200, and the personal computer 300, and at least one of the printer 100, the smartphone 200, and the personal computer 300 displays the second medium information M2 on at least one of the first display mechanism 14, the second display mechanism 24, and the third display mechanism 34.

With this configuration, at least one of the printer 100, the smartphone 200, and the personal computer 300 generates the second printing characteristic information P2 indicating the characteristic of the second image PC2 different from the first image PC1 when the user gives the instruction to print the second image PC2, to transmit the second printing characteristic information P2 to the server apparatus 400. In addition, the server apparatus 400 determines the second medium information M2 indicating the printing medium M conforming to the second printing characteristic information P2 based on the analysis information AS, to transmit the second medium information M2 to at least one of the printer 100, the smartphone 200, and the personal computer 300. At least one of the printer 100, the smartphone 200, and the personal computer 300 displays the second medium information M2 on at least one of the first display mechanism 14, the second display mechanism 24, and the third display mechanism 34.

Therefore, since the second medium information M2 indicating the printing medium M conforming to the second printing characteristic information P2 indicating the characteristic of the second image PC2 is displayed, the user can easily know the second medium information M2 conforming to the second image PC2. Therefore, the convenience of the user when the printer 100 prints the second image PC2 can be improved.

In addition, in the printing system 1 according to the present embodiment, the first printing characteristic information P1 includes at least one of the subject information indicating the feature of the subject included in the first image PC1, the color tone information indicating the color tone of the first image PC1, and the model information indicating the model of the printer 100, and the second printing characteristic information P2 includes at least one of the subject information indicating the feature of the subject included in the second image PC2, the color tone information indicating the color tone of the second image PC2, and the model information indicating the model of the printer 100.

With this configuration, since the first printing characteristic information P1 includes at least one of the subject information and the color tone information of the first image PC1, and the model information of the printer 100, appropriate analysis information AS can be generated. In addition, since the second printing characteristic information P2 includes at least one of the subject information and the color tone information of the second image PC2, and the model information of the printer 100, the appropriate second medium information M2 can be determined based on the analysis information AS. Therefore, the convenience of the user when the printer 100 prints the second image PC2 can be improved.

In addition, in the printing system 1 according to the present embodiment, at least one of the printer 100, the smartphone 200, and the personal computer 300 stores the first printing characteristic information P1 and the first medium information M1 in association with each other each time the printer 100 executes printing, and transmits the first printing M1 to the server apparatus 400 when printing of the first image PC1 is completed or each time a preset period elapses.

With this configuration, when the first printing characteristic information P1 and the first medium information M1 are transmitted to the server apparatus 400 when printing of the first image PC1 is completed, the server apparatus 400 can quickly acquire the first printing characteristic information P1 and the first medium information M1. In addition, when the first printing characteristic information P1 and the first medium information M1 are transmitted to the server apparatus 400 each time the preset period elapses, a frequency of transmission to the server apparatus 400 can be reduced, and thus a communication load of the server apparatus 400 can be reduced.

In addition, in the printing system 1 according to the present embodiment, when the user operates the printer 100, the printer 100 transmits the first printing characteristic information P1, the first medium information M1, and the second printing characteristic information P2 to the server apparatus 400, the server apparatus 400 transmits the second medium information M2 to the printer 100, and the printer 100 displays the second medium information M2 on the first display mechanism 14, when the user operates the smartphone 200, the smartphone 200 transmits the first printing characteristic information P1, the first medium information M1, and the second printing characteristic information P2 to the server apparatus 400, the server apparatus 400 transmits the second medium information M2 to the smartphone 200, and the smartphone 200 displays the second medium information M2 on the second display mechanism 24, and when the user operates the personal computer 300, the personal computer 300 transmits the first printing characteristic information P1, the first medium information M1, and the second printing characteristic information P2 to the server apparatus 400, the server apparatus 400 transmits the second medium information M2 to the personal computer 300, and the personal computer 300 displays the second medium information M2 on the third display mechanism 34.

With this configuration, since the second medium information M2 is displayed on the apparatus operated by the user out of the printer 100, the smartphone 200, and the personal computer 300, the user can easily know the second medium information M2 conforming to the second image PC2. Therefore, the convenience of the user when the printer 100 prints the second image PC2 can be improved.

In addition, in the printing system 1 according to the present embodiment, when the user gives the instruction to print the second image PC2, the printer 100 displays the screen showing that printing of the second image PC2 is being executed and including the image indicating the second medium information M2 on the first display mechanism 14.

With this configuration, the printer 100 displays the image indicating the second medium information M2 on the screen indicating that printing of the second image PC2 is being executed, and thus the user can easily check the second medium information M2 conforming to the second image PC2. Therefore, the convenience of the user when the printer 100 prints the second image PC2 can be improved.

In addition, in the printing system 1 according to the present embodiment, at least one of the printer 100, the smartphone 200, and the personal computer 300 transmits the holding medium information K2 that is the information indicating the type of the printing medium M held by the user to the server apparatus 400, the server apparatus 400 generates the conformity rank information R2 indicating the rank of conformity to the second printing characteristic information P2 in association with the type of the medium held by the user based on the analysis information AS and the holding medium information K2, to transmit the conformity rank information R2 to at least one of the printer 100, the smartphone 200, and the personal computer 300, and at least one of the printer 100, the smartphone 200, and the personal computer 300 displays the conformity rank information R2 on at least one of the first display mechanism 14, the second display mechanism 24, and the third display mechanism 34.

With this configuration, since the conformity rank information R2 indicating the rank of conformity to the second printing characteristic information P2 in association with the type of the medium held by the user is generated based on the analysis information AS and the holding medium information K2, the appropriate conformity rank information R2 can be generated. In addition, since the conformity rank information R2 is displayed on at least one of the printer 100, the smartphone 200, and the personal computer 300, the user can easily know the conformity rank information R2. Therefore, the convenience of the user when the printer 100 prints the second image PC2 can be improved.

The control method of the printing system 1 according to the present embodiment is the control method of the printing system 1 including the printer 100 including the first display mechanism 14, the smartphone 200 including the second display mechanism 24, the personal computer 300 including the third display mechanism 34, and the server apparatus 400 communicably connected to the printer 100, the smartphone 200, and the personal computer 300, the control method including generating, via at least one of the printer 100, the smartphone 200, and the personal computer 300, the first printing characteristic information P1 indicating the characteristic of the first image PC1 for which the user gives the printing instruction, to transmit the first printing characteristic information P1 and the first medium information M1 indicating the printing medium M used for printing to the server apparatus 400, storing, via the server apparatus 400, the plurality of pieces of first printing characteristic information P1 and the plurality of pieces of first medium information M1 in association with each other, to generate the analysis information AS by analyzing the relationship between the plurality of pieces of first printing characteristic information P1 and the plurality of pieces of first medium information M1, generating, via at least one of the printer 100, the smartphone 200, and the personal computer 300, the second printing characteristic information P2 indicating the characteristic of the second image PC2 different from the first image PC1 when the user gives the instruction to print the second image PC2, to transmit the second printing characteristic information P2 to the server apparatus 400, determining, via the server apparatus 400, the second medium information M2 indicating the printing medium M conforming to the second printing characteristic information P2 based on the analysis information AS, to transmit the second medium information M2 to at least one of the printer 100, the smartphone 200, and the personal computer 300, and displaying, via at least one of the printer 100, the smartphone 200, and the personal computer 300, the second medium information M2 on at least one of the first display mechanism 14, the second display mechanism 24, and the third display mechanism 34.

With this configuration, the same effect as the effect of the printing system 1 according to the present embodiment is obtained.

The present embodiment illustrates one aspect, and any modification and application can be made without departing from the spirit.

In the present embodiment, a case in which the "terminal apparatus" is configured with the smartphone 200 and the personal computer 300 is described, but the present disclosure is not limited to this. The "terminal apparatus" may be configured with, for example, the smartphone 200 or the personal computer 300. In addition, the "terminal apparatus" may be configured with, for example, a tablet terminal.

In addition, in the present embodiment, a case in which the "printing apparatus" is the ink jet printer 100 is described, but the present disclosure is not limited to this. The "printing apparatus" may be, for example, a multifunction machine. In addition, the "printing apparatus" may be a laser printer using toner.

In addition, in the present embodiment, a case in which the "printing apparatus" is configured with two printers 100, that is, the first printer 100A and the second printer 100B is described, but the present disclosure is not limited to this.

The "printing apparatus" may be configured with, for example, one printer 100. In addition, the "printing apparatus" may be configured with, for example, three or more printers 100.

In addition, in the present embodiment, a case in which the printer 100, the smartphone 200, and the personal computer 300 transmit the first printing characteristic information P1 and the first medium information M1 to the server apparatus 400 is described, but the present disclosure is not limited to this. At least one of the printer 100, the smartphone 200, and the personal computer 300 need only transmit the first printing characteristic information P1 and the first medium information M1 to the server apparatus 400. For example, the printer 100 may transmit the first printing characteristic information P1 and the first medium information M1 to the server apparatus 400. In addition, for example, the smartphone 200 may transmit the first printing characteristic information P1 and the first medium information M1 to the server apparatus 400.

In the present embodiment, the control method of the printing system 1 realized by the fourth processor 41A provided in the server apparatus 400 executing the fourth control program PGM4 is described. However, in order to realize the control method, the configuration with an aspect of a recording medium on which the fourth control program PGM4 executed by the fourth processor 41A is recorded in a computer-readable manner, or a transmission medium that transmits the fourth control program PGM4 can be adopted.

A magnetic or optical recording medium or a semiconductor memory device can be used as the recording medium described above. Examples of the recording medium include a portable or fixed recording medium, such as a flexible disk, an HDD, a compact disk read only memory (CD-ROM), a digital versatile disk (DVD), a Blu-ray (registered trademark) disc, a magneto-optical disk, a flash memory, or a card type recording medium.

The recording medium may be a non-volatile storage device, such as a RAM, a ROM, or an HDD, which is an internal storage device provided in the server apparatus 400.

The function of the fourth control section 41 of the server apparatus 400 may be realized by one or a plurality of processors or a semiconductor chip. The fourth control section 41 may have a configuration further including a sub-processing apparatus (co-processor) such as a system-on-a-chip (SoC), a micro control unit (MCU), and an FPGA. The fourth control section 41 may execute various controls by causing both the CPU and the sub-processing apparatus to cooperate with each other or selectively using one of both the CPU and the sub-processing apparatus.

In the present embodiment, the control method of the printing system 1 realized by the first processor 11A provided in the printer 100 executing the first control program PGM1 is described. However, in order to realize the control method, the configuration with an aspect of a recording medium on which the first control program PGM1 executed by the first processor 11A is recorded in a computer-readable manner, or a transmission medium that transmits the first control program PGM1 can be adopted.

A magnetic or optical recording medium or a semiconductor memory device can be used as the recording medium described above. Examples of the recording medium include a portable or fixed recording medium, such as a flexible disk, an HDD, a CD-ROM, a DVD, a Blu-ray (registered trademark) disc, a magneto-optical disk, a flash memory, or a card type recording medium.

The recording medium may be a non-volatile storage device, such as a RAM, a ROM, or an HDD, which is an internal storage device provided in the printer 100.

The function of the first control section 11 of the printer 100 may be realized by one or a plurality of processors or a semiconductor chip. The first control section 11 may have a configuration further including a sub-processing apparatus such as a SoC, an MCU, or an FPGA. The first control section 11 may execute various controls by causing both the CPU and the sub-processing apparatus to cooperate with each other or selectively using one of both the CPU and the sub-processing apparatus.

The processing unit of the flowchart of FIG. 11 is divided in accordance with the main processing content in order to facilitate understanding of the processing of the fourth control section 41 of the server apparatus 400, and is not limited by the method or name of division of the processing unit. The processing unit of the flowchart may be divided into a larger number of processing units in accordance with the processing content. One processing unit may be divided to include a larger number of processing. The order of the processing may be appropriately changed as long as the change does not interfere with the spirit.

Each of functional sections illustrated in FIGS. 2 and 4 to 6 illustrates a functional configuration, and a specific installation form is not particularly limited. It is not always required to install hardware corresponding to each functional section individually, and a configuration can be adopted in which the functions of a plurality of functional sections are realized by one processor executing the program. In addition, in the above-described embodiment, a part of the functions realized by software may be realized by hardware, or a part of the functions realized by hardware may be realized by software. In addition, a specific detailed configuration of each of the other sections of the printer 100, the smartphone 200, the personal computer 300, and the server apparatus 400 can be optionally changed without departing from the spirit.

In addition, in the present embodiment, a case in which the "printing apparatus" is the ink jet printer 100 and the "printing medium" is the paper such as the cut paper is described, but the present disclosure is not limited to this. The "printing apparatus" may be a direct to film (DTF) printer or a direct to garment (DTG) printer, and the "printing medium" may be a fabric such as silk, cotton, or polyester.

In addition, in the present embodiment, the second medium information M2 is displayed in the apparatus operated by the user out of the printer 100, the smartphone 200, and the personal computer 300. However, a guidance to the site where the second medium information M2 can be purchased, for example, the URL of the site may be displayed together with the second medium information M2.

What is claimed is:

1. A printing system comprising:

a printing apparatus including a first display section;

a terminal apparatus including a second display section; and a server apparatus communicably connected to the printing apparatus and the terminal apparatus, wherein at least one of the printing apparatus and the terminal apparatus generates first printing characteristic information indicating a characteristic of a first image for which a user gives a printing instruction, to transmit the first printing characteristic information and first medium information indicating a printing medium used for printing to the server apparatus, the server apparatus stores a plurality of pieces of the first printing characteristic information in association with a plurality of pieces of the first medium information, to generate analysis information by analyzing a relationship between the plurality of pieces of the first printing characteristic information and the plurality of pieces of the first medium information, at least one of the printing apparatus and the terminal apparatus generates second printing characteristic information indicating a characteristic of a second image different from the first image when the user gives an instruction to print the second image, to transmit the second printing characteristic information to the server apparatus, at least one of the printing apparatus and the terminal apparatus transmits holding medium information that is information indicating a type of a printing medium held by the user to the server apparatus, the server apparatus determines second medium information indicating a printing medium conforming to the second printing characteristic information based on the analysis information, to transmit the second medium information to at least one of the printing apparatus and the terminal apparatus, the server apparatus generates conformity rank information indicating a rank of conformity to the second printing characteristic information in association with the type of the printing medium held by the user based on the analysis information and the holding medium information, to transmit the conformity rank information to at least one of the printing apparatus and the terminal apparatus, and at least one of the printing apparatus and the terminal apparatus displays the second medium information and the conformity rank information on at least one of the first display section and the second display section.

2. The printing system according to claim 1, wherein the first printing characteristic information includes at least one of subject information indicating a feature of a subject included in the first image, color tone information indicating a color tone of the first image, and model information indicating a model of the printing apparatus, and the second printing characteristic information includes at least one of subject information indicating a feature of a subject included in the second image, color tone information indicating a color tone of the second image, and the model information indicating the model of the printing apparatus.

3. The printing system according to claim 1, wherein at least one of the printing apparatus and the terminal apparatus stores the first printing characteristic information in association with the first medium information each other each time the printing apparatus executes printing, and transmits the first printing characteristic information and the first medium information to the server apparatus when printing of the first image is completed or each time a preset period elapses.

4. The printing system according to claim 1, wherein when the user operates the printing apparatus, the printing apparatus transmits the first printing characteristic information, the first medium information, and the second printing characteristic information to the server apparatus, the server apparatus transmits the second medium information to the printing apparatus, and the printing apparatus displays the second medium information on the first display section, and when the user operates the terminal apparatus, the terminal apparatus transmits the first printing characteristic information, the first medium information, and the second printing characteristic information to the server apparatus, the server apparatus transmits the second medium information to the terminal apparatus, and the terminal apparatus displays the second medium information on the second display section.

5. The printing system according to claim 1, wherein when the user gives the instruction to print the second image, the printing apparatus displays a screen showing that printing of the second image is being executed and including an image indicating the second medium information on the first display section.

6. A control method of a printing system including a printing apparatus including a first display section, a terminal apparatus including a second display section, and a server apparatus communicably connected to the printing apparatus and the terminal apparatus, the control method comprising:

generating, via at least one of the printing apparatus and the terminal apparatus, first printing characteristic information indicating a characteristic of a first image for which a user gives a printing instruction, to transmit the first printing characteristic information and first medium information indicating a printing medium used for printing to the server apparatus;

storing, via the server apparatus, a plurality of pieces of the first printing characteristic information in association with a plurality of pieces of the first medium information, to generate analysis information by analyzing a relationship between the plurality of pieces of the first printing characteristic information and the plurality of pieces of the first medium information;

generating, via at least one of the printing apparatus and the terminal apparatus, second printing characteristic information indicating a characteristic of a second image different from the first image when the user gives an instruction to print the second image, to transmit the second printing characteristic information to the server apparatus;

transmitting, via at least one of the printing apparatus and the terminal apparatus, holding medium information that is information indicating a type of a printing medium held by the user to the server apparatus;

determining, via the server apparatus, second medium information indicating a printing medium conforming to the second printing characteristic information based on the analysis information, to transmit the second medium information to at least one of the printing apparatus and the terminal apparatus;

generating, via the server apparatus, conformity rank information indicating a rank of conformity to the second printing characteristic information in association with the type of the printing medium held by the user based on the analysis information and the holding medium information, to transmit the conformity rank information to at least one of the printing apparatus and the terminal apparatus; and displaying, via at least one of the printing apparatus and the terminal apparatus, the second medium information and the conformity rank information on at least one of the first display section and the second display section.

7. A printing system comprising:

a printing apparatus including a first display section;

a terminal apparatus including a second display section; and a server apparatus communicably connected to the printing apparatus and the terminal apparatus, wherein when a user operates the printing apparatus, the printing apparatus generates first printing characteristic information indicating a characteristic of a first image for which the user gives a printing instruction, to transmit the first printing characteristic information and first medium information indicating a printing medium used for printing to the server apparatus, the server apparatus stores a plurality of pieces of the first printing characteristic information in association with a plurality of pieces of the first medium information, to generate analysis information by analyzing a relationship between the plurality of pieces of the first printing characteristic information and the plurality of pieces of the first medium information, the printing apparatus generates second printing characteristic information indicating a characteristic of a second image different from the first image when the user gives an instruction to print the second image, to transmit the second printing characteristic information to the server apparatus, the server apparatus determines second medium information indicating a printing medium conforming to the second printing characteristic information based on the analysis information, to transmit the second medium information to the printing apparatus, and the printing apparatus displays the second medium information on the first display section, and when the user operates the terminal apparatus, the terminal apparatus generates the first printing characteristic information, to transmit the first printing characteristic information and the first medium information to the server apparatus, the terminal apparatus generates the second printing characteristic information, to transmit the second printing characteristic information to the server apparatus, the server apparatus determines the second medium information, to transmit the second medium information to the terminal apparatus, and the terminal apparatus displays the second medium information on the second display section.

* * * * *